(12) United States Patent
Yamamoto et al.

(10) Patent No.: US 6,520,645 B2
(45) Date of Patent: Feb. 18, 2003

(54) PROJECTION-TYPE DISPLAY DEVICE AND METHOD OF ADJUSTMENT THEREOF

(75) Inventors: Hideki Yamamoto, Saitama (JP); Tetsuyuki Miyawaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/974,009

(22) Filed: Oct. 9, 2001

(65) Prior Publication Data

US 2002/0033932 A1 Mar. 21, 2002

Related U.S. Application Data

(63) Continuation of application No. 09/413,455, filed on Oct. 6, 1999, now Pat. No. 6,331,060.

(30) Foreign Application Priority Data

Oct. 8, 1998 (JP) .............................. 10-286166
Oct. 8, 1998 (JP) .............................. 10-286209

(51) Int. Cl.[7] .............................................. G03B 21/14
(52) U.S. Cl. ................................ 353/31; 353/20; 349/5
(58) Field of Search ............................ 353/20, 31, 33, 353/34, 37, 69; 349/5, 8, 7, 9, 18

(56) References Cited

U.S. PATENT DOCUMENTS 5,621,486 A    4/1997  Doany et al.
5,648,860 A  * 7/1997  Ooi et al. ...................... 349/10
5,815,221 A  * 9/1998  Kojima et al. ............... 348/751
5,986,815 A  * 11/1999 Bryars ........................ 359/634
6,108,132 A  * 8/2000  Itoh .......................... 359/487
6,179,423 B1 * 1/2001  Kato et al. .................... 353/31
6,331,060 B1 * 12/2001 Yamamoto et al. ............ 353/31

FOREIGN PATENT DOCUMENTS

JP          0390511 A2    3/1990
JP          0520369 A1    6/1992
JP          10206842      1/1997
JP           803758 A2    4/1997

* cited by examiner

*Primary Examiner*—William Dowling
(74) *Attorney, Agent, or Firm*—Bell, Boyd & Lloyd LLC

(57) ABSTRACT

A projection-type display device for displaying an image using a projector device emitting optical images spatially modulated by reflection-type liquid crystal panels onto a screen, wherein phase difference plates are arranged at the incidence planes of the reflection-type liquid panels so as to cancel out the retardation comprised of the retardation corresponding to one-quarter of the wavelength of the incident light due to the polarization beam splitter plus the retardations due to the dichroic mirrors of the color separating and synthesizing means, whereby it is possible to make the illumination light leaking from the polarization beam splitter to the projection lens at the black level portions extremely small and possible to prevent a reduction in the contrast due to the haze phenomenon.

10 Claims, 18 Drawing Sheets

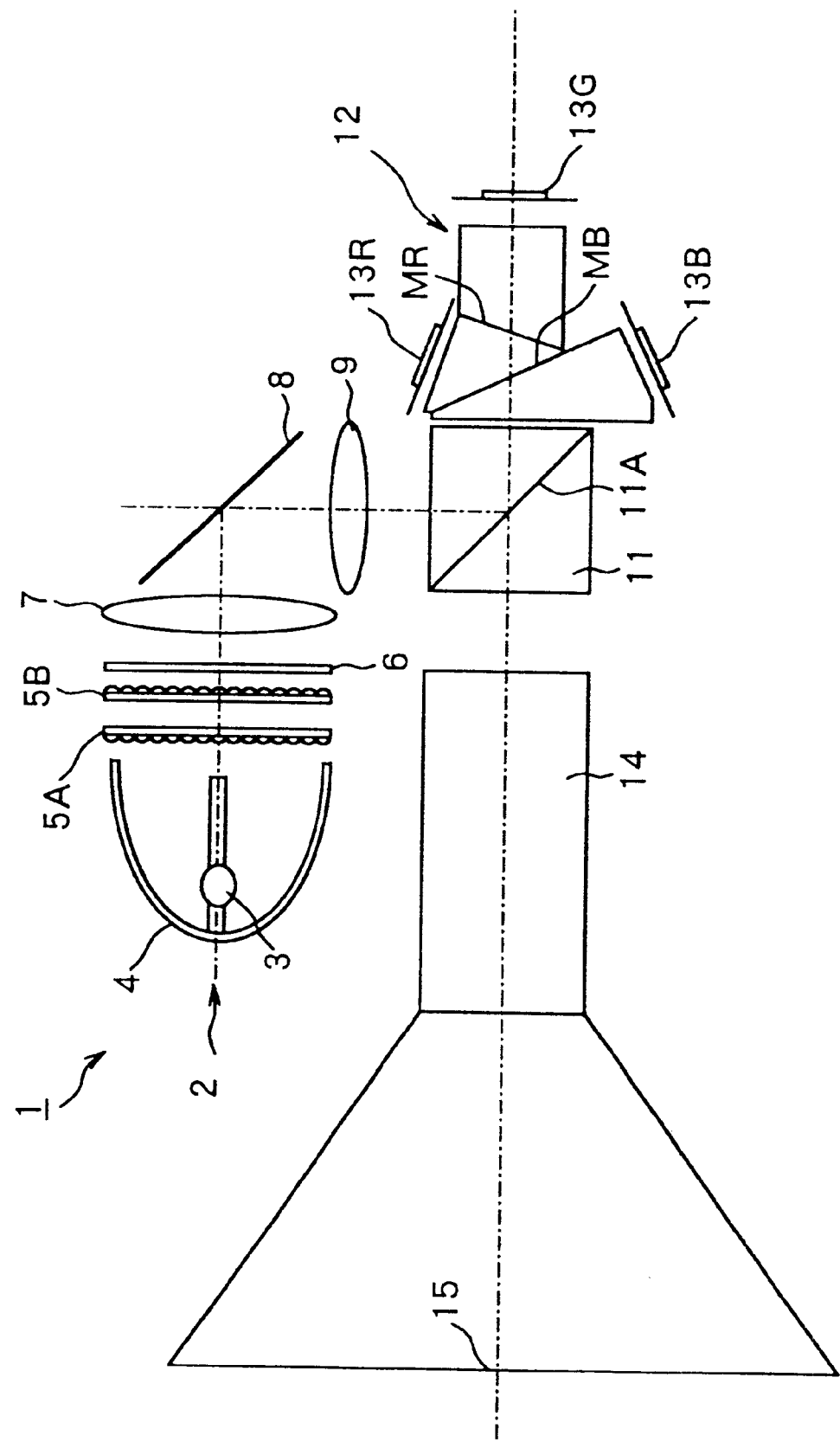

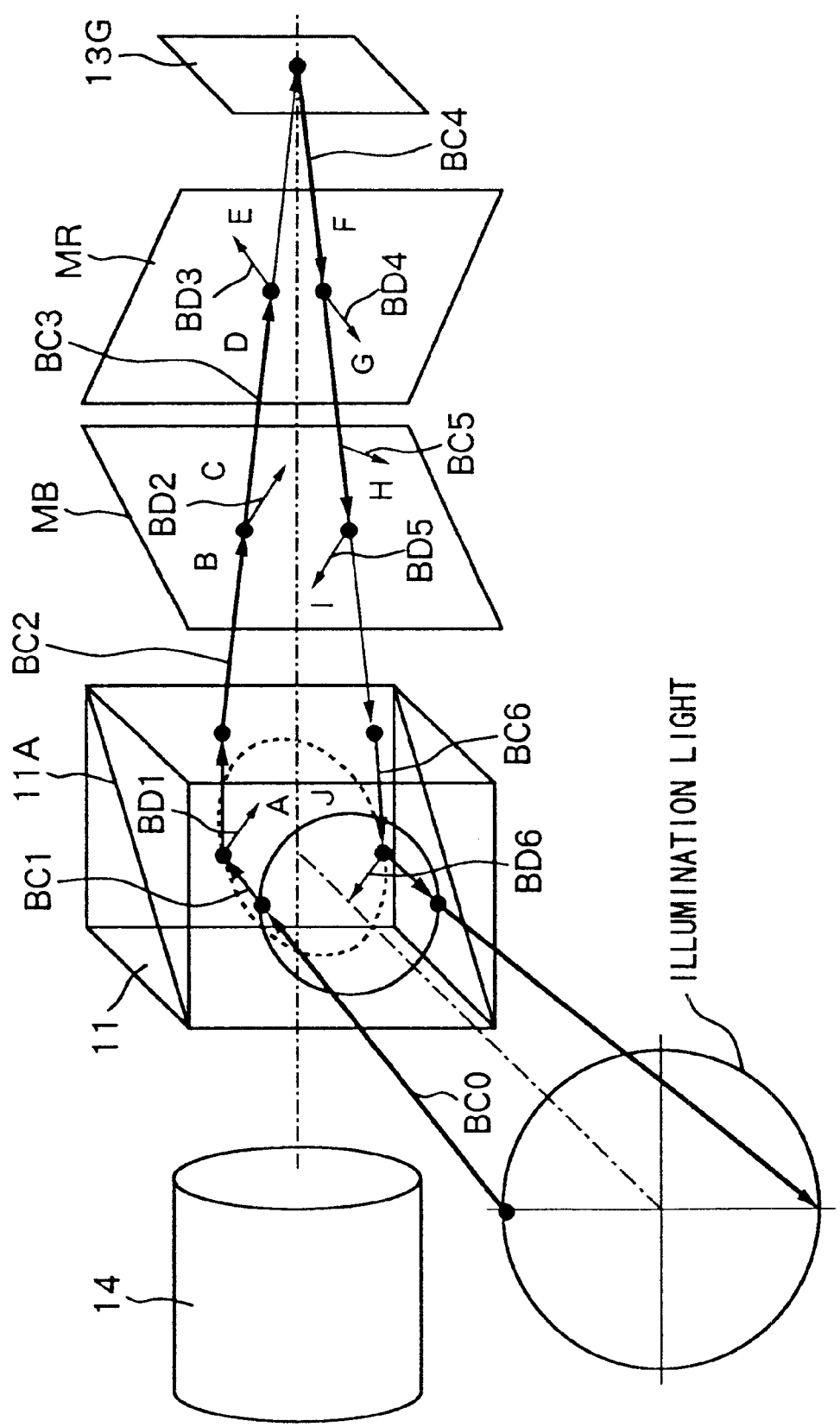

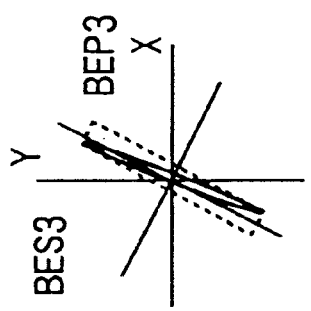
FIG.5A
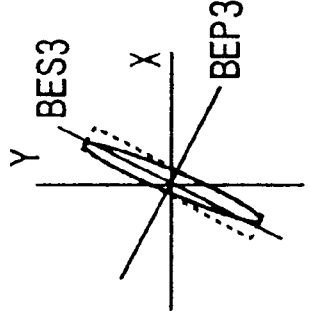
FIG.5B
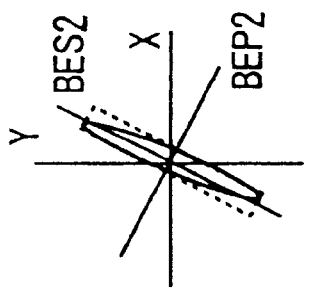
FIG.5C
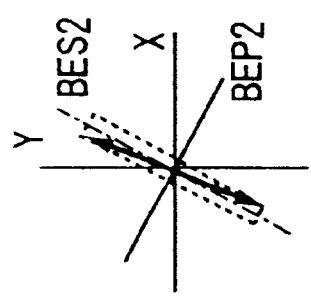
FIG.5D
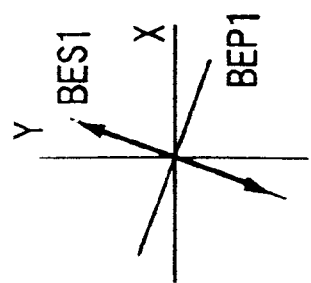
FIG.5E
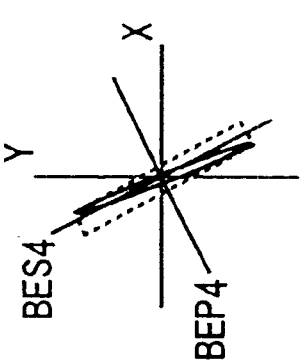
FIG.5F
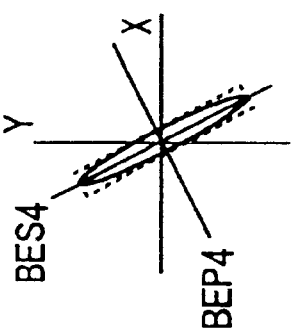
FIG.5G
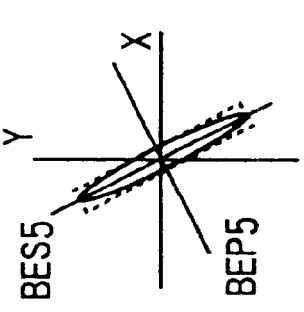
FIG.5H
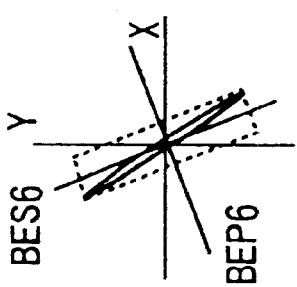
FIG.5I
FIG.5J

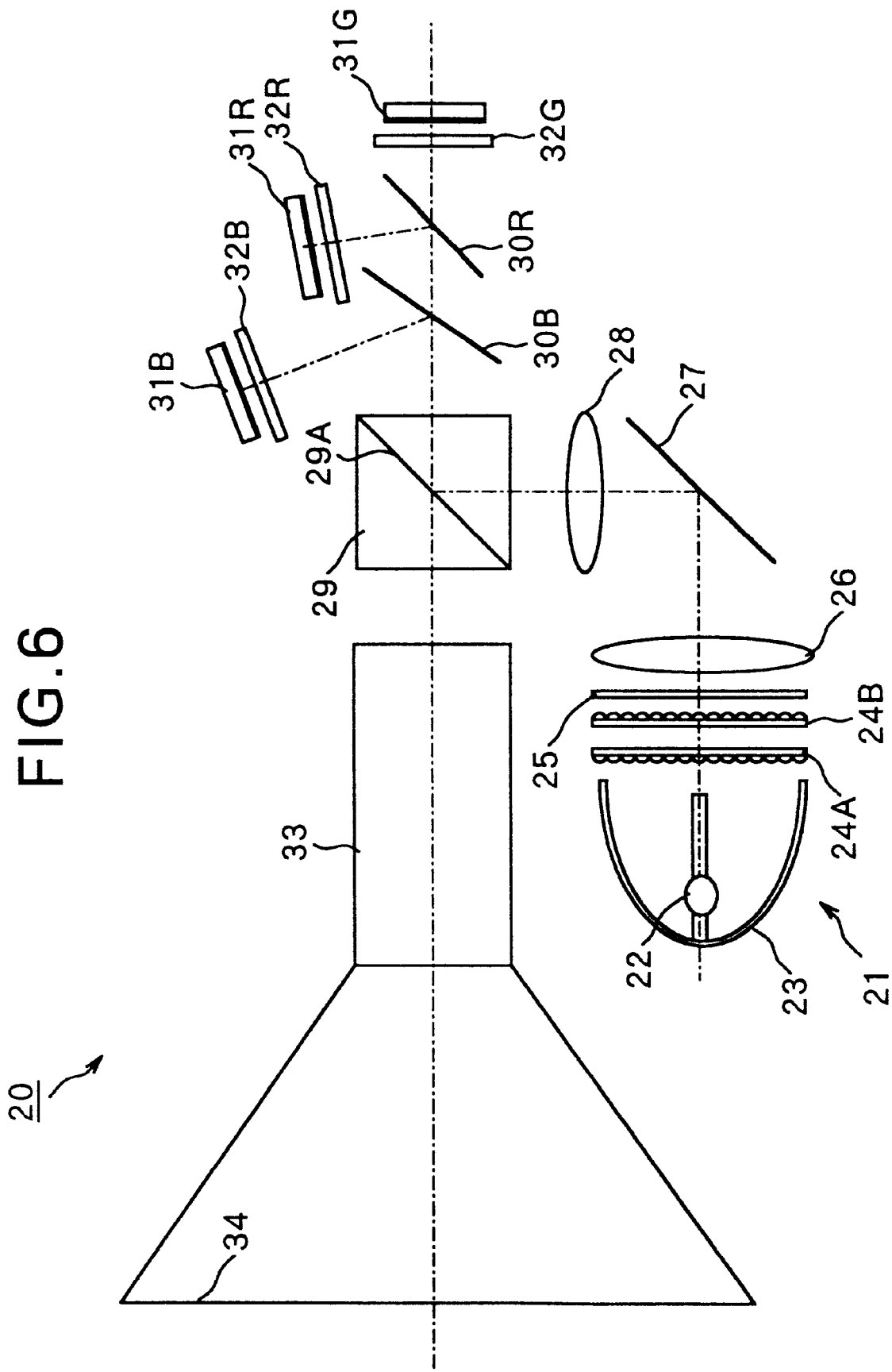

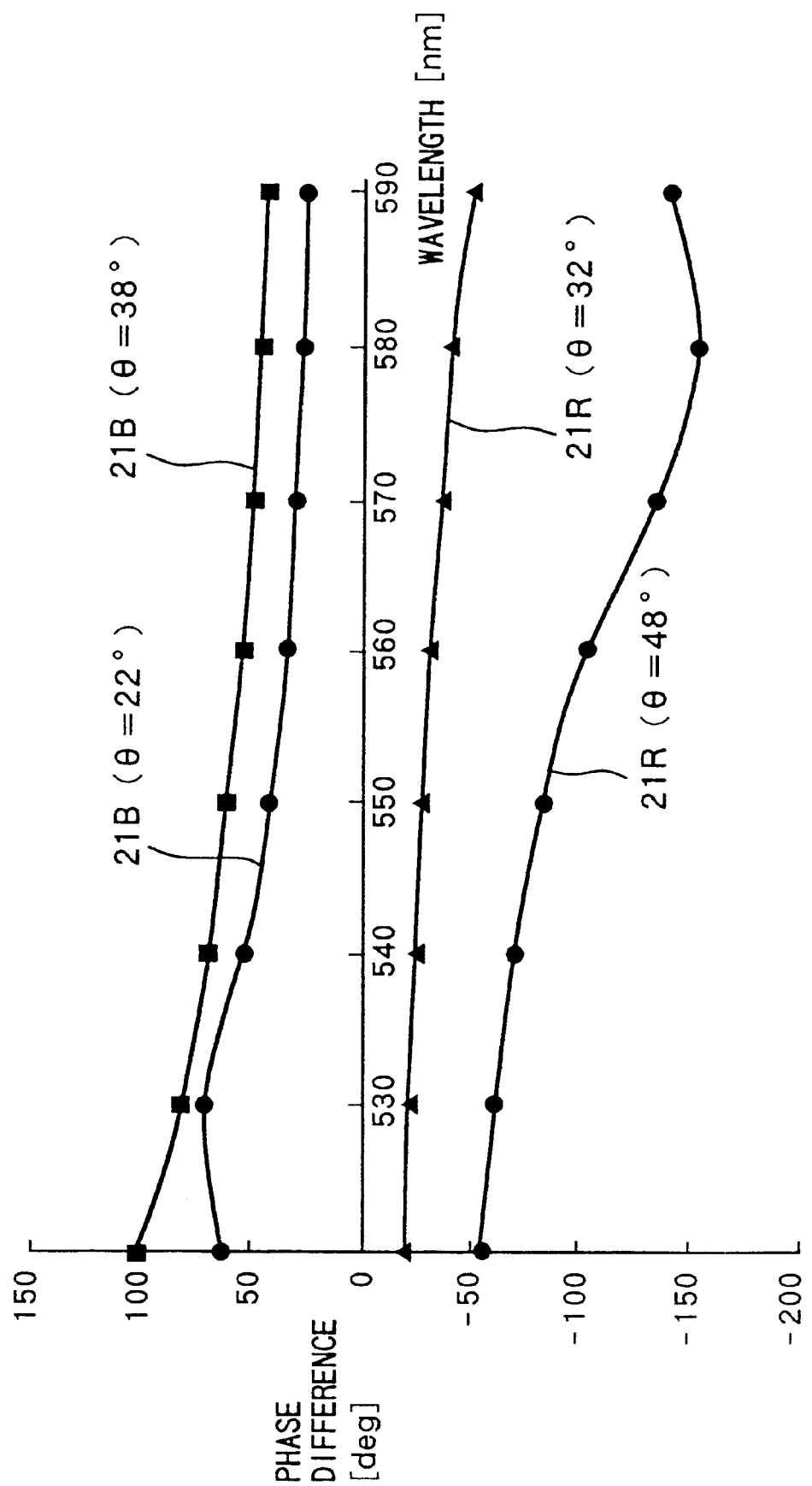

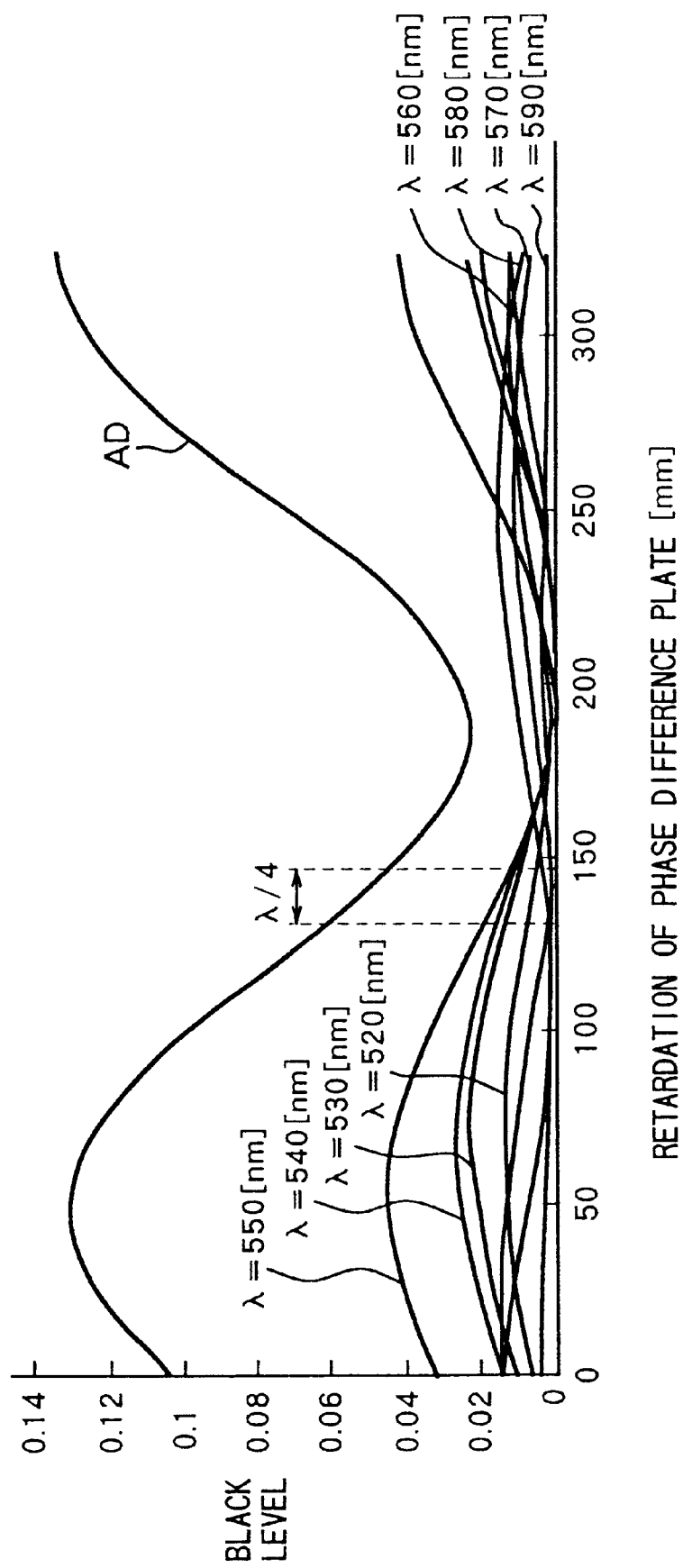

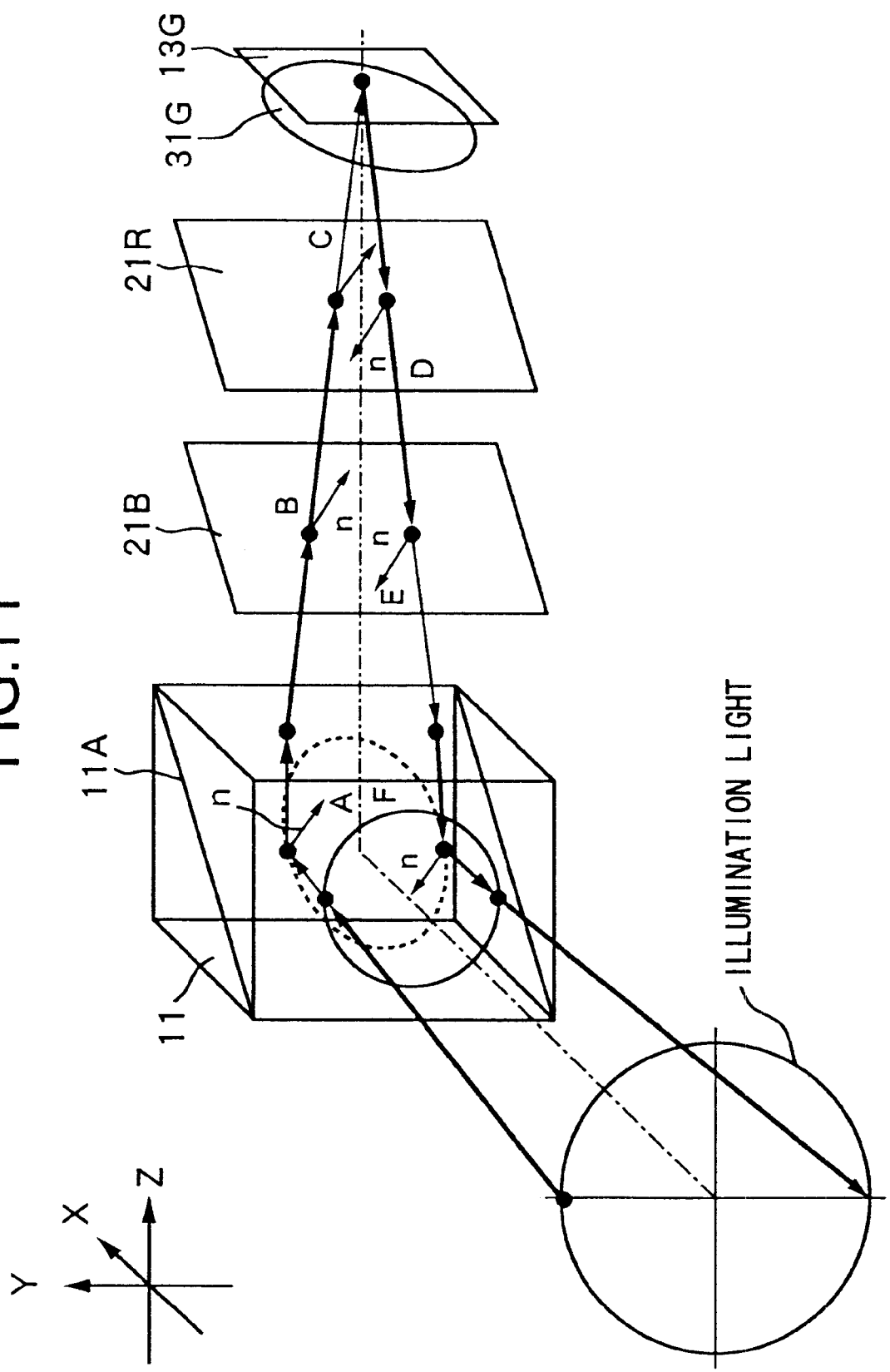

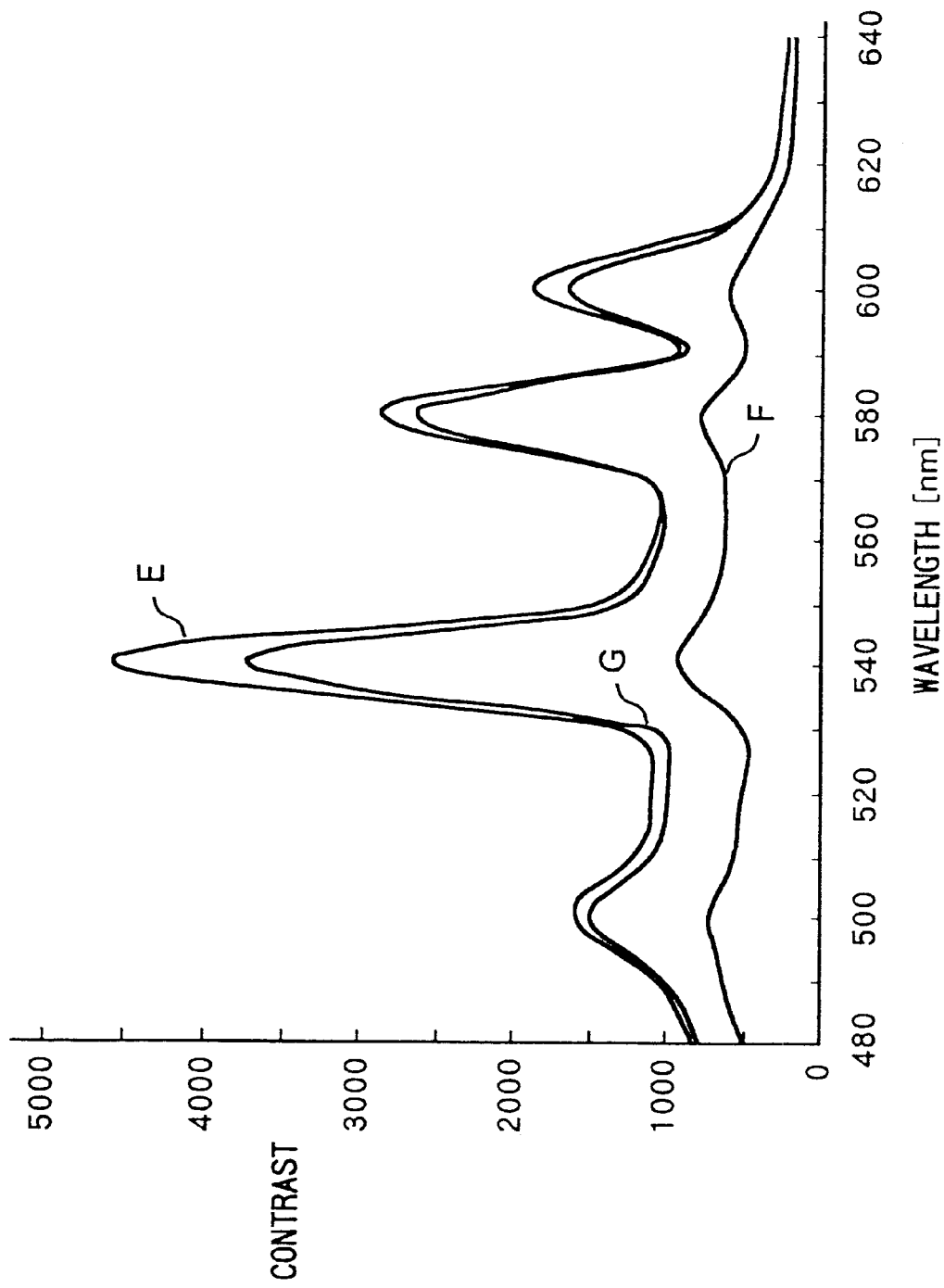

PROJECTION-TYPE DISPLAY DEVICE AND METHOD OF ADJUSTMENT THEREOF

RELATED APPLICATION DATA

The present invention is a continuation of U.S. patent application Ser. No. 09/413,455 filed on Oct. 6, 1999, which issued as U.S. Pat. No. 6,331,060 on Dec. 18, 2001 now U.S. Pat No. 6,331,060.

BACKGROUND OF THE INVENTION

1. Field of the Invention

The present invention relates to a projection-type display device which can be applied to for example a projector device for projecting an optical image spatially modulated by reflection-type liquid crystal panels onto a screen.

2. Description of the Related Art

In the related art, a projection-type display device has been proposed which is configured to use reflection-type liquid crystal panels to generate spatially modulated optical images and to project the optical images onto a screen so as to form a desired color image.

Among such projection-type display devices, ones have been proposed which use dichroic mirrors or use dichroic prisms as the means for breaking down illumination light obtained from a light source into red, blue, and green illumination light for supply to corresponding reflection-type liquid crystal panels and for synthesizing the red, green, and blue optical images obtained from the reflection-type liquid crystal panels.

FIG. 1 is a view of the configuration of a projection-type display device using dichroic prisms.

In this projection-type display device 1 using dichroic prisms, as shown in FIG. 1, a light source 2 is comprised for example a discharge lamp 3 and a reflector 4 and emits white illumination light.

Further, the light source 2 uses fly eye lenses 5A and 5B to make the distribution of the amount of the illumination light uniform, then emits the light to a plane polarization conversion element 6. Here, the plane polarization conversion element 6 selectively transmits mainly the s-polarization component and converts the p-polarization component orthogonal to this to the s-polarization component.

Due to this, the light source 2 emits illumination light increased in the polarization component effective for the image display in the illumination light projected from the discharge lamp 3 by the various plane polarizations and reduced in the polarization component orthogonal to this. As a result, the efficiency of utilization of the illumination light is improved by that extent and the contrast of the display image is improved.

A convex lens 7 converges and emits this illumination light on the path of the illumination light emitted from the plane polarization conversion element 6.

A cold mirror 8 emits the components of the illumination light emitted from the convex lens 7 other than the infrared region reflected in a direction 90 degrees from the path of incidence.

A convex lens 9 converges and emits the illumination light reflected at the cold mirror 8.

A polarization beam splitter 11 is formed by adhering inclined planes of rectangular prisms to each other and is formed with a detecting plane 11A at the adhered planes. The polarization beam splitter 11 selectively reflects and emits from the detecting plane 11A the illumination light due to the s-polarized light emitted from the convex lens 28, while selectively transmits the p-polarization component in the synthesized optical image incident on it traveling back along the path of the illumination light due to the s-polarized light and returns the s-polarization component to the light source 2.

A dichroic prism 12 is formed by adhering inclined planes of three prisms each having a predetermined form to each other and is arranged so that the adhered planes cut across the path of the light projected from the polarization beam splitter 11. The dichroic prism 12 is formed with dichroic films MB, MR obtained by lamination of dielectric films to a predetermined thickness on the adhered planes cutting across the optical path. The blue and red illumination light in the illumination light projected from the polarization beam splitter 11 are successively selectively reflected at the dichroic films MB, MR. Due to this, the dichroic prism 12 breaks down the illumination light projected from the polarization beam splitter 11 into blue, red, and green illumination light and supplies them to the blue, red, and green color reflection-type liquid crystal panels 13B, 13R, and 13G arranged at the bottom surface of the prism.

The reflection-type liquid crystal panels 13B, 13R, and 13G are driven by corresponding color signals. The illumination light incident by the s-polarized light is reflected with the plane polarization rotated for every pixel. Due to this, optical images changed in plane polarization in accordance with the color signals are projected.

The dichroic prism 12, conversely to the case of the illumination light, synthesizes the blue, red, and green optical images obtained from the reflection-type liquid crystal panels to generate a synthesized optical image and projects the synthesized optical image to the polarization beam splitter 11.

Specifically, the synthesized optical image travels back along the path of the illumination light due to the synthesized light of the p-polarized light and s-polarized light in accordance with the color signals and is emitted to the polarization beam splitter 11. Further, only the p-polarization component in the synthesized optical image passes through the polarization beam splitter 11 and is projected to the projection lens 14.

In this way, the projection lens 14 projects the synthesized optical image passing through the polarization beam splitter 11 to the screen 15. Due to this, a color image is displayed by enlarging and projecting onto the screen the images generated by the reflection-type liquid crystal panels 13B, 13R, and 13G.

Further, a projection-type display device using dichroic mirrors is configured to break down the illumination light incident from a polarization beam splitter into red, blue, and green illumination light by dichroic mirrors instead of the dichroic prisms 12 and project them onto the reflection-type liquid crystal panels and to synthesize the optical images projected from the reflection-type liquid crystal panels and emit the result on a projection lens.

In this type of projection-type display device 1, however, there has been the disadvantage that the so-called haze phenomenon occurs where light is also projected at portions which should inherently be displayed black and those portions are displayed whitish and this haze phenomenon causes a reduction in the contrast of the projected image.

The haze phenomenon will be explained in further detail below.

In the projection-type display device 1, the portion which inherently should be displayed black is reflected without any rotation of the plane polarization of the corresponding illumination light at the reflection-type liquid crystal panels. As a result, in the projection-type display device 1, the corresponding optical images are returned to the light source 2 side by the polarization beam splitter 11. Due to this, the corresponding portion should be displayed black on the screen 15.

In the projection-type display device 1, however, this type of optical image which should be detected at the polarization beam splitter 11 by the s-polarized light is detected by the synthesized light of the s-polarized light and the p-polarized light. Due to this, this type of haze phenomenon is generated.

That is, in an optical system provided with a polarization beam splitter 11, dichroic prisms 12, etc., a phase difference is given in the direction of vibration of the light to the p-polarized light parallel to the boundary planes and the s-polarized light orthogonal to the p-polarization component using as a reference the incidence plane and emission plane of the polarization beam splitter 11, the light detecting plane, the boundary plane of the dichroic film etc. Due to this, in this type of projection-type display device, when viewed as an optical system as a whole, the direction of the p-polarization component initially separated by the polarization beam splitter 11 changes at the boundary planes. Further, the phase difference generated at the boundary planes in this way changes by the incident wavelength and angle of incidence to the boundary planes.

As a result, in the projection-type display device 1, the states of polarization change in the illumination light and optical images propagated through the optical system. Due to this, light is mixed into the portions inherently to be displayed black by the s-polarized light and the haze phenomenon occurs.

FIG. 2 is a view for explaining the changes in the states of polarization. FIG. 2 corresponds to the configuration of the above-mentioned FIG. 1 and shows the case where the illumination light incident from the convex lens 9 is reflected at the polarization beam splitter 11, then successively passes through the dichroic films MB, MR, and strikes the reflection-type liquid crystal panel 13G where it is reflected without modulation. Note that below the letter B will be added to the references to indicate a vector.

In this case, assume that the unit vector showing the direction of the incident illumination light is the direction cosine BC0 and the direction cosines showing the directions of the illumination light at the boundary planes of the detecting plane 11A of the polarization beam splitter 11 and the dichroic film MB and dichroic film MR, all boundary planes, are BC1, BC2, and BC3. Further, the direction cosines showing the directions of the optical images at the corresponding boundary planes after reflection by the reflection-type liquid crystal panels 13G are BC4, BC5, and BC6. Further, the unit vectors showing the arrangement of the boundary planes corresponding to these direction cosines are made normal vectors and indicated by the references BD1, BD2, BD3, BD4, BD5, and BD6.

The s-polarization components BESn orthogonal to the incidence planes of the boundary planes are defined by the following equation with the direction of advance defined by the outer product of the direction cosines and the normal vectors:

$$BESn = BCn \times BDn / |BCn \times BDn| \quad (1)$$

(where, n=1 to 6)

Further, the direction cosines of the p-polarization component parallel to the incidence planes of the boundary planes intersect the direction of advance of the s-polarization components BESn at right angles and are expressed by the vector products of the following equation:

$$BEPn = BESn \times BCn / |BESn \times BCn| \quad (2)$$

(where, n=1 to 6)

At this time, the direction cosines become $BC2 = BC3 \neq BC1$, $BC4 = BC5 \neq BC6$. Due to the refraction at the polarization beam splitter 11, only the direction cosines BC1 and BC6 differ. Note that the normal vectors are $BD1 \approx BD2$, inner product $BD2 \cdot BD3 \approx 0$, $BD5 \approx BD6$, inner product $BD4 \cdot BD5 \approx 0$.

It is possible to obtain the relationship of the following formula from formula (1), formula (2), and the relationship of the direction cosine BCn and the normal vector BDn. Note that the orthogonal p-polarization component BEPn becomes the same relationship.

$$BES1 \approx BES2 \neq BES3 \quad (3)$$

FIGS. 3A to 3J are views of the states of polarization around the boundary planes by the absolute coordinate system x-y seen from the reflection-type liquid crystal panel side.

As shown in FIG. 3A, at the reflection side of the detecting plane 11A of the polarization beam splitter 11, the illumination light due to the direction cosine BC0 strikes the polarization beam splitter 11. Only the s-polarization component is selectively reflected in accordance with the direction of the p-polarization component and the s-polarization component determined at the detecting plane 11A and becomes linear polarized light.

As opposed to this, in front of the boundary plane of the dichroic film MB, as shown in FIG. 3B, the directions of the p-polarization component and s-polarization component differ slightly from the time of reflection at the polarization beam splitter 11 (the p-polarization component and s-polarization component at the dichroic film shown by the broken line rectangle). Due to this, the illumination light is broken down into the p-polarization component and the s-polarization component at the dichroic film MB and given a phase difference ($BES1 \approx BES2$).

As a result, after the boundary plane of the dichroic film MB, as shown in FIG. 3C, the illumination light becomes elliptical polarized light.

Further, in front of the boundary plane of the dichroic film MR, as shown in FIG. 3D, the directions of the p-polarization component and s-polarization component largely differ. The illumination light is broken down at the dichroic film MR into the p-polarization component and s-polarization component which are then given a phase difference ($BES2 \neq BES3$).

As a result, as shown in FIG. 3E, after the boundary plane of the dichroic film MR, the illumination light can become elliptical polarized light with a largely increased short diameter. When reflected without any polarization at the reflection-type liquid crystal panel 13G, the reflected light becomes elliptical polarized light as showing the front of the boundary plane of the dichroic film MR in FIG. 3F.

The optical image projected from the reflection-type liquid crystal panel as the elliptical polarized light in this way, as shown in FIGS. 3F to 3I, in the same way as the illumination light, is successively broken down into the corresponding p-polarization component and s-polarization component by the dichroic films MR, MB. As shown in FIG.

3J, when striking the detecting plane 11A of the polarization beam splitter 11, an s-polarization component is generated with respect to the detecting plane 11A as shown by the broken rectangle showing the directions of the p-polarized light and s-polarized light at the detecting plane 11A. In this case, the larger the amount of the p-polarization component BEPn, the greater the amount of light leaking out to the projection lens 14 and the more a haze state is formed.

As one method to solve this problem, Japanese Unexamined Patent Publication (Kokai) No. 6-175123 proposes the method of arranging the dichroic film inclined in the opposite direction with respect to the detecting plane 11A of the polarization beam splitter 11 and designing a dielectric multilayer film comprising the dichroic film so as to reduce the change in the state of polarization.

In this first method, the phase difference given to the p-polarization component and s-polarization component by the dichroic films at the boundary plane changes depending on the incident wavelength and angle of incidence. Therefore, it is possible to form a state sufficiently satisfying the change in the state of polarization for a specific wavelength and specific angle of incidence.

In the first method, however, it is difficult to obtain a satisfactory state for an incident wavelength and angle of incidence different from the specific wavelength and specific angle of incidence. In the final analysis, there are still problems in practice.

Further, Japanese Unexamined Patent Publication (Kokai) No. 10-26756, as shown in FIG. 4, proposes a second method of arranging the detecting plane 11A and dichroic films MB, MR in parallel and providing a quarter wavelength plate λ/4 in front of the reflection-type liquid crystal panel 13G so as to reduce the haze phenomenon.

In this case, among the direction cosines, only the direction cosines BC1 and BC6 differ due to the refraction of the polarization beam splitter 11, so BC2=BC3≠BC1 and BC4=BC5≠BC6. Further, the normal vectors become BD1≈BD2≈BD3 and BD4≈BD5≈BD6.

In this case, the relationship of the following formula is obtained from formulas (1) and (2) and the relationship between the direction cosines BCn and the normal vectors BDn. Note that the orthogonal p-polarization component BEPn becomes the same relationship.

$$BES1 \approx BES2 \approx BES3 \quad (4)$$

As shown by the state of polarization in the case of application of the second method in FIGS. 5A to 5J from the comparison with FIGS. 3A to 3J, according to the second method, by arranging the detecting plane 11A and the dichroic films MB, MR, it is possible to make the p-polarization component and the s-polarization component substantially match (BES1≈BES2≈BES3) just before the detecting plane 11A (FIG. 5A), just before the dichroic film MB (FIG. 5B), and just before the dichroic film MR (FIG. 5D) and to reduce changes in the state of polarization.

Further, by arranging a quarter wavelength plate λ/4 with a retardation phase axis matched with the Y-axis, it is possible to make the optical image (FIG. 5F) emitted from the quarter wavelength plate λ/4 symmetrical with the Y-axis of the illumination light (FIG. 5E) incident on the quarter wavelength plate λ/4. Therefore, it is possible to make the p-polarization component and the s-polarization component substantially match just before the dichroic film MR at the optical image (FIG. 5F), just before the dichroic film MB (FIG. 5H), and just before the detecting plane 11A (FIG. 5J) and possible to reduce the p-component (BEP6) incident on the detecting plane 11A.

However, considering the dependence of a quarter wavelength plate λ/4 on the angle of incidence and wavelength, when in the case of an index of refraction of the extraordinary ray Ne, the index of refraction of the ordinary ray No, and the thickness D, a phase difference is given to the planes of vibration by exactly a retardation shown in the following formula in the quarter wavelength plate λ/4, where, ΔN=Ne-No, λ= incident wavelength, and θ= angle of incidence:

$$\sigma = \frac{2\pi \Delta ND}{\lambda \cos\theta} \quad (5)$$

The quarter wavelength plate λ/4 is a phase difference plate with a ΔND of λ0/4 with respect to an angle of incidence θ of 0 and a specific wavelength of λ0. The phase difference given to the p-polarized light and the s-polarized light changes in accordance with the incident wavelength and angle of incidence on the path of the illumination light.

On this point, in the example explained in relation to FIGS. 5A to 5J, the phase differences given to the planes of vibration by the dichroic films MB, MR also change according to the incident wavelength and the angle of incidence. Due to this, depending on the quarter wavelength plate λ/4, when the directions of the p-polarization component and the s-polarization component differ even slightly, the light emitted from the detecting plane 11A due to linear polarization changes to elliptical polarized light depending on the angle of incidence and wavelength of the illumination light. In the end, at the stage where the optical image strikes the detecting plane 11A, it is no longer possible to sufficiently reduce the p-polarization component (BEP6) at the detecting plane 11A.

Further, even when the detecting plane 11A and dichroic films MB, MR are arranged in parallel, in practice the illumination light incident on and emitted from the polarization beam splitter 11 is light with a spread. The direction cosine changes due to the index of refraction of the polarization beam splitter 11 and the angle of incidence of the illumination light to the dichroic films MB, MR becomes larger.

Due to this, the illumination light shown in FIG. 5B incident on the dichroic film MB becomes elliptical polarized light. Further, when passing back and forth through the quarter phase plate λ/4, it is given a phase difference of at least 90 degrees according to the above formula (5). Due to this, in the illumination light, a state of non-symmetry about the Y-axis is formed between the case when emitted from the dichroic film MR toward the reflection-type liquid crystal panel 13G (FIG. 5E) and the case when reflected at the reflection-type liquid crystal panel 13G by non-polarization and striking the dichroic film MR.

In this case, when the optical image repeatedly passes through the dichroic films MR, MB and strikes the detecting plane 11A of the polarization beam splitter 11, it is difficult to make the p-component (BEP6) of the polarization beam splitter 11 the smallest and the p-component of the elliptical polarized light is emitted to the projection lens 14.

Due to these, it is difficult even with the second method to sufficiently reduce the haze phenomenon and increase the contrast of the display image.

SUMMARY OF THE INVENTION

An object of the present invention is to provide a projection-type display device able to prevent a reduction in contrast due to the haze phenomenon and display a high quality display image and a method of adjustment of the same.

According to a first aspect of the present invention, there is provided a projection-type display device provided with at least a plurality of reflection-type image forming means for spatially modulating and reflecting incident light and emitting optical images rotated in plane polarization with respect to a plane polarization of the incident light; a light source for emitting illumination light; color separating and synthesizing means for breaking down the illumination light by wavelengths corresponding to the reflection-type imaging forming means and outputting the results to the reflection-type image forming means and for synthesizing optical images obtained from the reflection-type image forming means and emitting the synthesized optical image; a projection optical system for projecting the synthesized optical image to a predetermined projection object; and a polarization beam splitter for emitting a predetermined plane polarization component from the illumination light emitted from the light source to the color separating and synthesizing means and emitting the synthesized optical image obtained from the color separating and synthesizing means to the projection optical system; phase difference plates being arranged facing the light incidence/emission planes of the reflection-type image forming means; the phase difference plates setting retardations for canceling out the retardation comprised of the retardation corresponding to one-quarter of the wavelength of the incident light due to the polarization beam splitter plus retardation due to the color separating and synthesizing means.

According to a second aspect of the present invention, there is provided a projection-type display device provided with at least a plurality of reflection-type image forming means for spatially modulating and reflecting incident light and emitting optical images rotated in plane polarization with respect to a plane polarization of the incident light; a light source for emitting illumination light; color separating and synthesizing means for breaking down the illumination light by wavelengths corresponding to the reflection-type imaging forming means and outputting the results to the reflection-type image forming means and for synthesizing optical images obtained from the reflection-type image forming means and emitting the synthesized optical image; a projection optical system for projecting the synthesized optical image to a predetermined projection object; and a polarization beam splitter for emitting a predetermined plane polarization component from the illumination light emitted from the light source to the color separating and synthesizing means and emitting the synthesized optical image obtained from the color separating and synthesizing means to the projection optical system; phase difference plates being arranged facing the light incidence/emission planes of the reflection-type image forming means; the retardations at the phase difference plates being set based on results of the ray tracing from the polarization beam splitter to the reflection-type image forming means, changing in accordance with the characteristics of the color separating and synthesizing means with respect to the angle of incidence and wavelength.

In the present invention, in the case of changing the retardations of the phase difference plates in various ways, the retardations of the phase difference plates are set to retardations giving the smallest overall amount of light passing through the polarization beam splitter in the case of a black level based on the ray tracing for each wavelength and angle of incidence of the illumination light incident from the polarization beam splitter to the color separating and synthesizing means.

Preferably, the color separating and synthesizing means comprises at least one dichroic mirror.

Preferably, the color separating and synthesizing means comprises at least one dichroic prism.

According to a third aspect of the present invention, there is provided a projection-type display device provided with at least a plurality of reflection-type image forming means for spatially modulating and reflecting incident light and emitting optical images rotated in plane polarization with respect to a plane polarization of the incident light; a light source for emitting illumination light; color separating and synthesizing means for breaking down the illumination light by wavelengths corresponding to the reflection-type imaging forming means and outputting the results to the reflection-type image forming means and for synthesizing optical images obtained from the reflection-type image forming means and emitting the synthesized optical image; a projection optical system for projecting the synthesized optical image to a predetermined projection object; and a polarization beam splitter for emitting a predetermined plane polarization component from the illumination light emitted from the light source to the color separating and synthesizing means and emitting the synthesized optical image obtained from the color separating and synthesizing means to the projection optical system; phase difference plates being arranged facing the light incidence/emission planes of the reflection-type image forming means; the phase difference plates changing the directions of polarization of the optical images in planes substantially orthogonal to the optical axis and being adjusted to positions making the direction of polarization of a detecting plane of the polarization beam splitter and the directions of polarization of the optical images substantially match.

According to a fourth aspect of the invention, there is provided projection-type display device provided with at least a plurality of reflection-type image forming means for spatially modulating and reflecting incident light and emitting optical images rotated in plane polarization with respect to a plane polarization of the incident light; a light source for emitting illumination light; color separating and synthesizing means for breaking down the illumination light by wavelengths corresponding to the reflection-type imaging forming means and outputting the results to the reflection-type image forming means and for synthesizing optical images obtained from the reflection-type image forming means and emitting the synthesized optical image; a projection optical system for projecting the synthesized optical image to a predetermined projection object; and a polarization beam splitter for emitting a predetermined plane polarization component from the illumination light emitted from the light source to the color separating and synthesizing means and emitting the synthesized optical image obtained from the color separating and synthesizing means to the projection optical system; phase difference plates being arranged facing the light incidence/emission planes of the reflection-type image forming means; holding mechanisms for holding the phase difference plates rotatably in planes substantially orthogonal to the optical axes being provided.

In the present invention, preferably, the phase difference plates set retardations so as to cancel out retardation comprised of the retardation corresponding to one-quarter of the wavelength of the incident light from the polarization beam splitter plus the retardations due to the color separating and synthesizing means.

Further, in the present invention, retardations at the phase difference plates are set based on results of the ray tracing from the polarization beam splitter to the reflection-type image forming means, changing in accordance with the characteristics of the color separating and synthesizing means with respect to the angle of incidence and wavelength.

Further, preferably, in the case of changing the retardations of the phase difference plates in various ways, the retardations of the phase difference plates are set to retardations giving the smallest overall amount of light passing through the polarization beam splitter in the case of a black level based on the ray tracing for each wavelength and angle of incidence of the illumination light incident from the polarization beam splitter to the color separating and synthesizing means.

Further, in the present invention, preferably the inclinations of the color separating and synthesizing means are set so that the angles between the optical axes of the illumination light on the color separating and synthesizing means and the optical axes of the optical images become smaller than 90 degrees.

According to a fifth aspect of the invention, there is provided a method of adjustment of a projection-type display device provided with at least a plurality of reflection-type image forming means for spatially modulating and reflecting incident light and emitting optical images rotated in plane polarization with respect to a plane polarization of the incident light; color separating and synthesizing means for breaking down the illumination light by wavelengths corresponding to the reflection-type imaging forming means and outputting the results to the reflection-type image forming means and for synthesizing optical images obtained from the reflection-type image forming means and emitting the synthesized optical image; and a polarization beam splitter for emitting a predetermined plane polarization component from the illumination light emitted from a light source to the color separating and synthesizing means and emitting the synthesized optical image obtained from the color separating and synthesizing means to a projection optical system; wherein phase difference plates are made to rotate in planes substantially orthogonal to the optical axes to adjust the phase differences given to the incident light and the optical images.

In the present invention, the phase difference plates are made to rotate in planes substantially orthogonal to the optical axes to change the directions of polarization of the optical images and wherein the positions of arrangement of the phase difference plates are adjusted to positions where the direction of polarization of the detecting plane of the polarization beam splitter and the directions of polarization of the optical images substantially match so as to adjust the phase differences given to the incident light and the optical images.

Further, preferably, after the adjustment ends, the phase difference plates are secured to the adjusted positions.

According to the first and second aspects of the present invention, by setting the retardations in the phase difference plates doubly refracting the incident light and the optical images so as to cancel out the retardation comprised of the retardation corresponding to one-quarter of the wavelength of the incident light due to the polarization beam splitter plus the retardations due to the color separating and synthesizing means, it is possible to reduce by that amount the leakage of the optical image component, which originally should not be emitted from the polarization beam splitter to the projection optical system, to the projection optical system side and thereby possible to prevent a reduction of the contrast due to the haze phenomenon.

Further, by arranging phase difference plates for doubly refracting the incident light and the optical images and setting retardations at the phase difference plates based on the results of the ray tracing from the polarization beam splitter to the reflection-type image forming means, changing in accordance with the characteristics of the color separating and synthesizing means with respect to the angle of incidence and wavelength, it is possible to take into consideration the characteristics of the color separating and synthesizing means and reduce the leakage of the optical image components to the projection optical system side and thereby possible to prevent a reduction of the contrast due to the haze phenomenon.

Further, according to the third, fourth, and fifth aspects of the present invention, by arranging phase difference plates for doubly refracting the incident light and the optical images at the refraction-type image forming means, it is possible to use the phase differences given to the incident light and optical images at the phase difference plates to reduce the polarization component causing the occurrence of the haze phenomenon. At this time, by rotating the phase difference plates in planes substantially orthogonal to the optical axes so as to adjust the phase differences given to the incident light and the optical images, even when the reflection-type image forming means etc. are arranged at an inclination, it is possible to prevent an increase in the polarization component causing the occurrence of the haze phenomenon due to the inclination. Therefore, it is possible to prevent the reduction of the contrast due to the haze phenomenon reliably due to the that much simpler assembly precision.

BRIEF DESCRIPTION OF THE DRAWINGS

These and other features of the present invention will become clearer from the following description of the preferred embodiments given with reference to the accompanying drawings, in which:

FIG. 1 is a view of the configuration of a projection-type display device of the related art, FIG. 2 is a view for explaining the path of the light in the projection-type display device of FIG. 1, FIGS. 3A to 3J are views of the states of polarization on the path of light of FIG. 2, FIG. 6 is a view of the configuration of a first embodiment of a projection-type display device according to the present invention, FIG. 7 is a graph of the transmission phase characteristics of a dichroic film in the projection-type display device of FIG. 6, FIG. 8 is a graph of the black level with respect to illumination light of an angle of incidence of 4 degrees in the projection-type display device of FIG. 6, FIG. 11 is a view of the paths of the illumination light and optical images in the case of correct arrangement of the reflection-type liquid crystal panels in the projection-type display device of FIG. 10, FIGS. 12A to 12F are views of the states of polarization on the path of light of FIG. 11, FIG. 17 is a graph used for explanation of the contrast in the projection-type display device of FIG. 10.

DESCRIPTION OF THE PREFERRED EMBODIMENTS

Figure 3A:
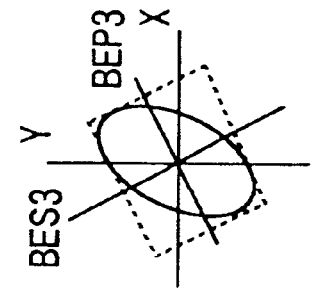
Figure 3B:
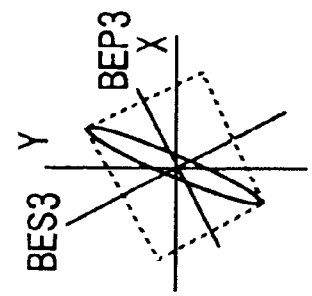
Figure 3C:
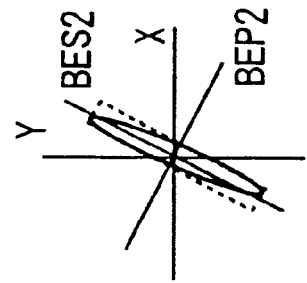
Figure 3D:
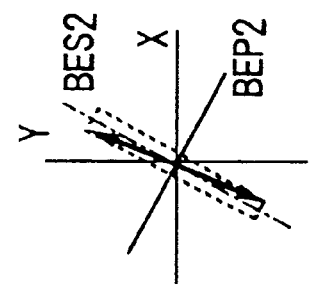
Figure 3E:
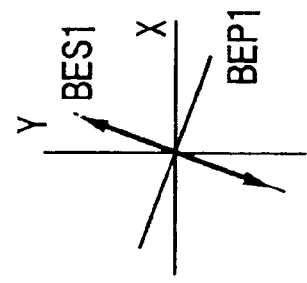
Figure 3F:
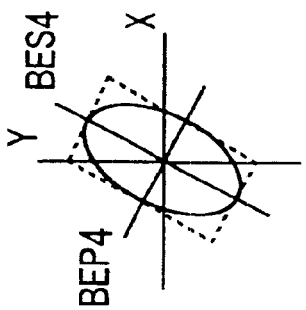
Figure 3G:
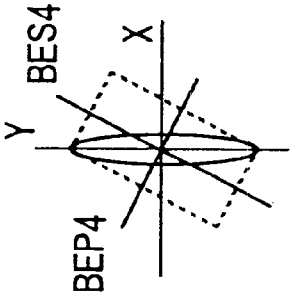
Figure 3H:
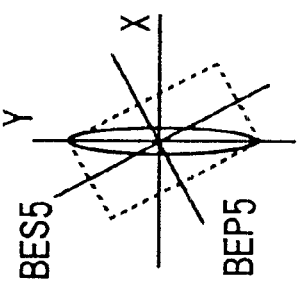
Figure 3I:
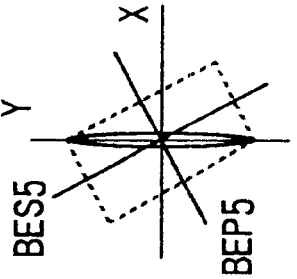
Figure 3J:
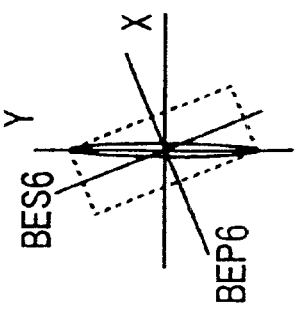
Figure 4:
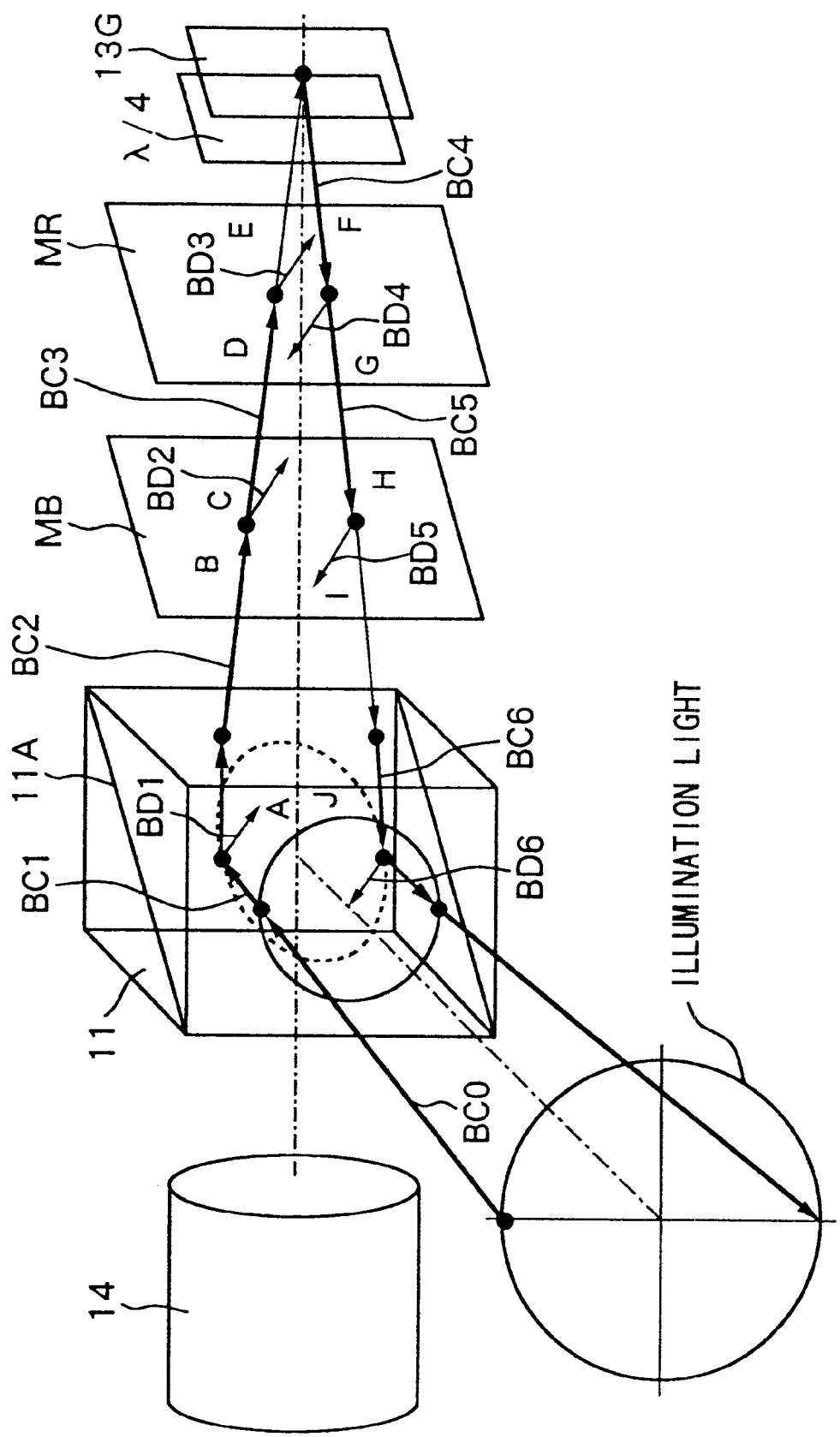
FIG. 4 is a view for explaining the path of light in the case of provision of a quarter wavelength plate in FIG. 1, FIGS. 5A to 5J are views of the states of polarization on the path of light of FIG. 4.

Below, embodiments of the present invention will be explained in detail by appropriately referring to the drawings.

First Embodiment

FIG. 6 is a view of the configuration of a first embodiment of a projection-type display device according to the present invention.

In a projection-type display device 20 of the first embodiment, dichroic mirrors are used to break down the illumination light into colors and synthesize optical images of different colors.

The embodiment of the present invention will be explained in detail below with reference to the drawings.

In the projection-type display device 20 using dichroic mirrors, a light source 21 is, as shown in FIG. 6, comprised for example of a discharge lamp 22 and a reflector 23 and emits white illumination light.

Further, the light source 21 uses a pair of fly eye lenses 24A and 24B to make the distribution of the amount of the illumination light uniform, then emits it to a plane polarization conversion element 25. Here, the plane polarization conversion element 25 mainly selectively transmits the s-polarization component and converts the p-polarization component orthogonal to this to an s-polarization component.

By this, the light source 21 increases the polarization component effective for the image display in the illumination light emitted with various plane polarizations from the discharge lamp 22, and reduces the polarization component orthogonal to this and emits the resultant illumination light. As a result, the efficiency of utilization of the illumination light is improved and the contrast of the display image is improved.

A convex lens 26 converges and emits the illumination light on the path of the illumination light emitted from the plane polarization conversion element 25.

A cold mirror 27 reflects and emits the illumination light emitted from the plane polarization conversion element 25 on the path of the illumination light.

A convex lens 28 converges and emits the illumination light reflected at the cold mirror 27.

A polarization beam splitter 29 is formed by adhering inclined planes of rectangular prisms to each other and is formed with a detecting plane 29A at the adhered planes. The polarization beam splitter 29 selectively reflects and emits from the detecting plane 29A the illumination light due to the s-polarized light emitted from the convex lens 28, while selectively transmits the p-polarization component in the synthesized optical image incident on it traveling back along the path of the illumination light due to the s-polarized light and returns the s-polarization component to the light source 21.

Further, in the first embodiment, a dichroic mirror 30B and dichroic mirror 30R are arranged after the polarization beam splitter 29.

The dichroic mirror 30B is arranged so that the angle formed between the optical axis extending from the projection lens 33 and the normal direction forms an angle of 30 degrees and so that the dichroic film faces substantially the same direction as the detecting plane of the polarization beam splitter 29.

The dichroic mirror 30B arranged in this way selectively reflects the blue illumination light from the illumination light incident from the polarization beam splitter 29 by a desired characteristic and selectively transmits the remaining illumination light.

Due to this, the dichroic mirror 30B separates the blue illumination light from the illumination light incident from the polarization beam splitter 29 and emits it toward a reflection-type liquid crystal panel 31B and further emits the blue optical image arriving from the reflection-type liquid crystal panel 31B toward the polarization beam splitter 29.

Further, the dichroic mirror 30B emits the remaining illumination light to the following dichroic mirror 30R and, conversely, emits the red and green optical images incident from the dichroic mirror 30R to the polarization beam splitter 29.

The following dichroic mirror 30R is arranged so that the angle formed between the optical axis extending from the projection lens 33 and the normal direction forms an angle of 40 degrees and so that the dichroic film faces substantially the same direction as the detecting plane 29A of the polarization beam splitter 29.

The dichroic mirror 30R arranged in this way selectively reflects the red illumination light from the illumination light incident from the dichroic mirror 30B by a desired characteristic and selectively transmits the remaining illumination light.

Due to this, the dichroic mirror 30R separates the red illumination light from the illumination light incident from the dichroic mirror 30B and emits it toward a reflection-type liquid crystal panel 30R and further emits the red optical image arriving from the reflection-type liquid crystal panel 31R toward the dichroic mirror 30B.

Further, the dichroic mirror 30R emits the remaining green illumination light to the following reflection-type liquid crystal panel 31G and, conversely, emits the green optical image incident from the reflection-type liquid crystal panel 31G to the dichroic mirror 30B.

The reflection-type liquid crystal panels 31B, 31R, and 31G are driven by corresponding color signals and reflect the illumination light incident due to the s-polarized light rotated in plane polarization for every pixel, thereby emitting optical images changed in plane polarization in accordance with the color signals.

Further, in the projection-type display device 20, the phase difference plates 32B, 32R, and 32G are arranged on the paths of the illumination light incident to the reflection-type liquid crystal panels 31B, 31R, and 31G from the dichroic mirrors 30B and 30R. Predetermined phase differences are given to the illumination light and the optical images from the phase difference plates 32B, 32R, and 32G.

Here, the phase difference plates 32B, 32R, and 32G are arranged close to the corresponding reflection-type liquid crystal panels 31B, 31R, and 31G so as to cut orthogonally across the optical axes of the illumination light and the optical images. In the phase difference plates 32B, 32R, and 32G, the thicknesses D are set so as to enable retardations of 165 nm, 190 nm, and 180 nm to be given between the ordinary rays and extraordinary rays for the transmission light orthogonal to the incidence planes. Note that the phase difference plates 32B, 32R, and 32G are uniaxial crystals with indexes of refraction No of 1.4 and Ne of 1.40234 and are expressed by a retardation of $\Delta ND$.

Due to this, the phase difference plates 32B, 32R, and 32G set retardations between the ordinary rays and extraordinary rays for the incident light so as to cancel out the retardation comprised of the retardation corresponding to one-quarter of the wavelength of the incident light from the polarization beam splitter 29 plus retardations due to the corresponding dichroic films for the corresponding illumination light and optical images.

Note that here, explaining this taking as an example for example the green color, in the quarter wavelength plate, from formula (5), $\Delta ND$ is 130 nm to 145 nm. In this embodiment, the changes in the states of polarization of the illumination light and the optical images due to the dichroic mirrors 30B and 30R are considered and more of a retardation is given from the phase difference plates by that amount.

That is, in these dichroic mirrors 30B and 30R, the phase differences given to the transmission light and the reflected light change according to the incident light wavelength and the angle of incidence. Therefore, in this embodiment, the phase difference plates 32R, 32B, and 32G set retardation enabling the haze phenomenon to be reduced the most based on the ray tracing due to various wavelengths and various angles of incidence for changing the retardations in the phase difference plates 32R, 32B, and 32G in various ways.

Here, the green illumination light and optical image will be considered. Note that the polarization beam splitter 29 is arranged so that the detecting plane of the polarization beam splitter 29 is inclined by exactly 45 degrees from the optical axis of the projection lens 33. At this time, the polarization beam splitter 29 is formed by a glass material with an index of refraction of 1.511.

In this case, in the practical range, the illumination light emitted from the polarization beam splitter 29 consists of a group of light beams of a maximum 8 degrees telecentric with respect to the optical axis. Here, first, the transmission phase characteristics of the dichroic mirrors 30B and 30R are measured for the group of light beams of an angle of 8 degrees. Note that here, a study was made idealizing the polarization beam splitter 29 by making the transmittance rates TS and TP of the s-polarized light and the p-polarized light the value 0 and the value 1, respectively. Further, the dichroic mirrors 30B and 30R were idealized making the indexes of refraction of the substrates the values 1.0.

FIG. 7 is a graph of the transmission phase characteristics of the dichroic mirrors 30B and 30R in the green wavelength band and shows the phase difference between the p-polarized light and the s-polarized light at different wavelengths for the light beams of the maximum value and minimum value of the angle of incidence on the dichroic mirrors 30B and 30R from the above group of light beams.

Next, the wavelength is sampled at a predetermined pitch in the transmittance phase characteristics obtained in this way, the phase difference given by the phase difference plate 32G is changed in various ways for every sampled wavelength to perform the ray tracing traveling back successively from the polarization beam splitter 29 through the dichroic mirrors 30B, 30R, the phase difference plate 32G, the reflection-type liquid crystal panel 31G, the phase difference plate 32G, the dichroic mirrors 30R, 30B, and the polarization beam splitter 29 so as to calculate the amount of light passing through the polarization beam splitter 29. Note that here, it is assumed that the incident light is reflected by the mirror surface corresponding to the black portions at the reflection-type liquid crystal panel 31G so as to perform the ray tracing corresponding to the black level.

FIG. 8 is a view of the results of the ray tracing of the illumination light incident at an angle of 4 degrees with respect to the optical axis obtained by sampling of the incident wavelength at a pitch of 10 nm.

In this case, it is learned that the amount of light passing through the polarization beam splitter 29 changes sinusoidally at the different wavelengths in accordance with the retardation given at the phase difference plate 32G and further that the phase of the change differs at the different wavelengths.

Figure 9:
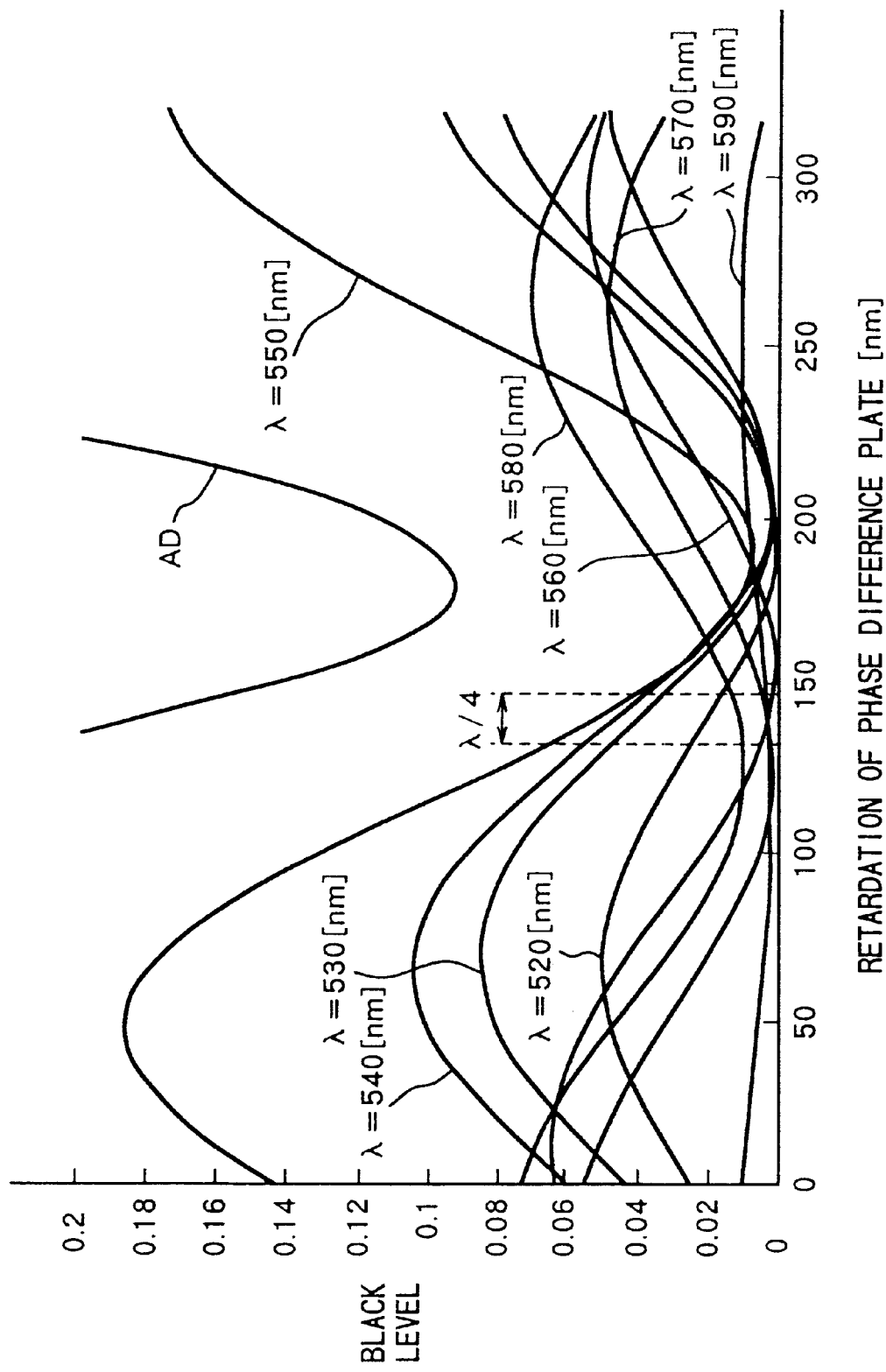
FIG. 9 is a graph of the black level with respect to illumination light of an angle of incidence of 8 degrees in the projection-type display device of FIG. 6.

Further, FIG. 9 is a view of the results of the ray tracing of the illumination light similarly incident at an angle of 8 degrees with respect to the optical axis.

In the first embodiment, based on the results of the ray tracing plotting on the abscissa the retardation at the phase difference plate 32G obtained in a matrix using as parameters the angle and the wavelength in this way, the amount of light passing through the polarization beam splitter 29 for every amount of retardation of the phase difference plate is added and the retardation giving the smallest amount of light transmission at the overall amount of light is set for the retardation of the phase difference plate 32G. Note that in the addition of the amount of light, the amount of light is corrected by the characteristics of human vision.

In FIG. 8 and FIG. 9, the amount of light shown by the reference AD shows this overall amount of light at the different angles of incidence. In this example, it is learned that retardations giving the overall amount of light transmission substantially match between the case of 8 degrees of incidence and the case of 4 degrees of incidence.

Note that in FIG. 8 and FIG. 9, the retardation due to the quarter wavelength plate is shown by the broken lines for reference.

Due to this, it is learned that in the first embodiment, it is possible to reduce the black level for illumination light of an angle of incidence of 4 degrees and 8 degrees to about one-half the luminance level compared with the case of arrangement of a quarter wavelength plate.

In the first embodiment, the retardations of the phase difference plates 32B and 32R are set for the blue and red colors in the same way as when setting the retardation of the phase difference plate 32G for the green color.

The projection lens 33 protects the synthesized optical image passing through the polarization beam splitter 29 on to the screen 34. Due to this, a color image obtained by enlarging and projecting the optical images generated at the reflection-type liquid crystal panels 31B, 31R, and 31G on the screen is displayed.

Next, the operation of the projection-type display device of FIG. 6 will be explained.

In the above configuration, the components of the illumination light emitted from the light source 21 except for the infrared light are bent 90 degrees in path at the cold mirror 27 and incident through the convex lens 28 to the polarization beam splitter 29. Here, the s-polarization component of the illumination light is selectively reflected and emitted toward the first dichroic mirror 30B. The blue illumination light is selectively reflected by the first dichroic mirror 30B and emitted toward the blue reflection-type liquid crystal panel 31B. The remaining green and red illumination light pass through the first dichroic mirror 30B and strike the following second dichroic mirror 30R.

The illumination light incident on the second dichroic mirror 30R is broken down into the red illumination light and the green illumination light which are then reflected from and transmitted through the second dichroic mirror 30R so that red illumination light and green illumination light are emitted toward the red reflection-type liquid crystal panel 31R and the green reflection-type liquid crystal panel 31G. Due to this, the illumination light of the corresponding wavelengths are supplied to the blue, red, and green reflection-type liquid crystal panels 31B, 31R, and 31G and rotated in plane polarization by the corresponding color signals at the reflection-type liquid crystal panels 31B, 31R, and 31G and blue, red, and green optical images due to the p-polarized light and s-polarized light are generated.

The blue, red, and green optical images due to the p-polarized light and the s-polarized light travel back along the paths of the illumination light striking the reflection-type liquid crystal panels 31B, 31R, and 31G and are synthesized by the first and second dichroic mirrors 30B and 30R. The p-polarization component in the synthesized optical image obtained as a result passes through the polarization beam splitter 29 and is projected by the projection lens 33 on the screen 34. The blue, red, and green optical images produced at the reflection-type liquid crystal panels 31B, 31R, and 31G are enlarged and projected on the screen 34 to form a color display image.

In the optical image projected on the screen 34 in this way, the unmodulated component which originally should not be polarized, but simply reflected at the reflection-type liquid crystal panels 31B, 31R, and 31G is mixed in. Due to this, a reduction of the contrast due to the haze phenomenon is observed at the display image projected on the screen 34.

This is due, in the final analysis, to the incidence of the optical image striking the polarization beam splitter 29 due to elliptical polarization. This elliptical polarization occurs due to detection of the illumination light and production of an s-polarization component by an inclined detecting plane 29A at the polarization beam splitter 29 whereby a phase difference corresponding to substantially one-quarter of the wavelength of the colors is given between the planes of vibration as seen from the reflection-type liquid crystal panels 31B, 31R, and 31G and, further, this s-polarization component is given a similar phase difference due to the phase characteristics at the dichroic mirrors 30B, 30R.

The above-mentioned phase difference changes depending on the wavelength and angle of incidence of the transmission light (FIG. 7 to FIG. 9). Due to this, with just arranging quarter wavelength plates in front of the reflection-type liquid crystal panels, it would become difficult to sufficiently prevent the haze phenomenon.

In the first embodiment, however, by arranging phase difference plates 32B, 32R, and 32G at the incidence planes of the reflection-type liquid crystal panels 31B, 31R, and 31G and setting retardations between the ordinary rays and extraordinary rays at the phase difference plates 32B, 32R, and 32G, the retardation comprised of the retardation corresponding to one-quarter of the wavelength of the incident light due to the polarization beam splitter 29 plus the retardations due to the dichroic mirrors 30B, 30R of the color separating and synthesizing means is canceled. Due to this, it becomes possible to make the projection lens 33 much smaller than the polarization beam splitter 29 at the black level portion. Therefore, it is possible to prevent a reduction in the contrast due to this haze phenomenon.

That is, in the first embodiment, the retardations at the phase difference plates 32B, 32R, and 32G are changed in various ways, the amounts of light passing through the polarization beam splitter 29 in the case of the black level are calculated by the ray tracing for every wavelength and angle of incidence for the illumination light incident to the dichroic mirror 30B from the polarization beam splitter 29, and retardations giving the smallest overall amount of light are set at the phase difference plates 32B, 32R, and 32G based on the overall amount of light resulting from addition of the light calculated in this way.

Further, at this time, the amounts of light are corrected based on the characteristics of human vision to calculate the overall amount of light. Due to this, the retardations of the phase difference plates 32B, 32R, and 32G are set so that the haze phenomenon is hardest to sense.

According to the first embodiment, phase difference plates 32B, 32R, and 32G are arranged at the incidence planes of the reflection-type liquid crystal panels 31B, 31R, and 31G to cancel out the retardation comprised of the retardation corresponding to one-quarter of the wavelength of the incident light from the polarization beam splitter 29 plus the retardations due to the dichroic mirrors 30B, 30R of the color separating and synthesizing means so as to enable the illumination light leaking from the polarization beam splitter 29 to the projection lens 33 at the black level portions to be kept extremely small. Therefore, it is possible to prevent a reduction in the contrast due to the haze phenomenon to that extent.

Second Embodiment

Figure 10:
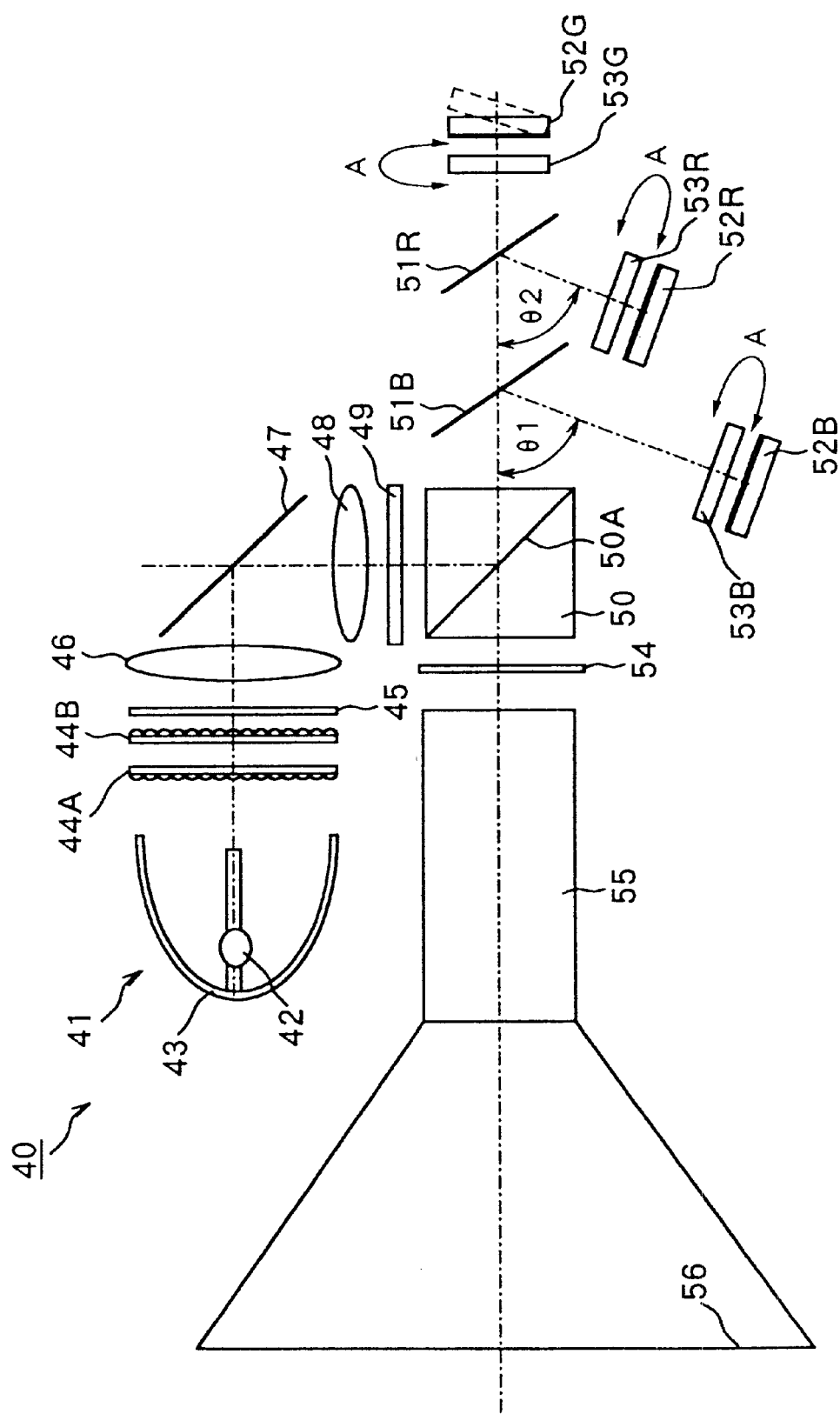
FIG. 10 is a view of the configuration of a second embodiment of a projection-type display device according to the present invention.
Figure 12C:
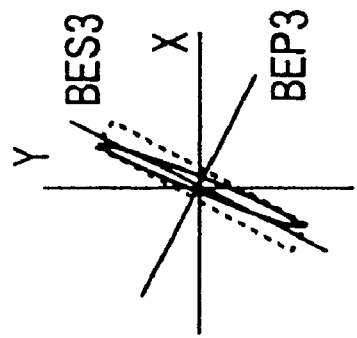
Figure 12B:
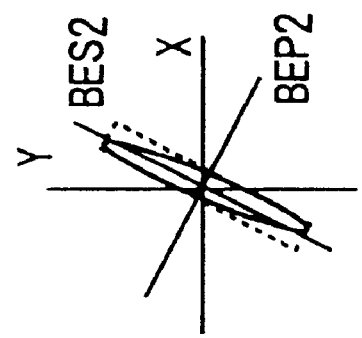
Figure 12A:
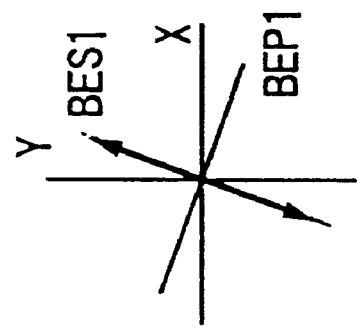
Figure 12D:
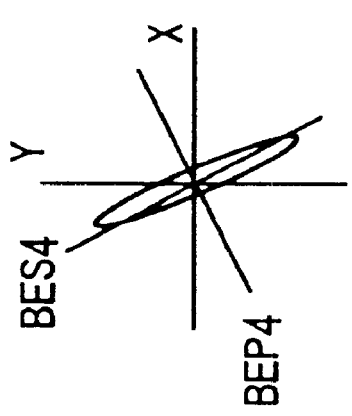
Figure 12E:
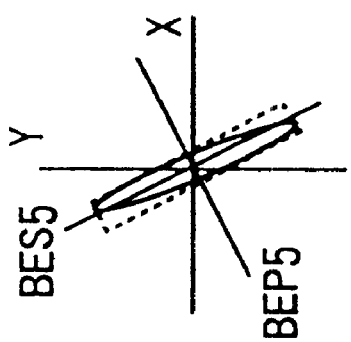
Figure 12F:
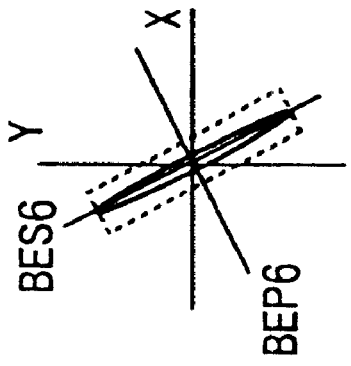

FIG. 10 is a view of the configuration of a second embodiment of a projection-type display device according to the present invention.

The point of difference between the projection-type display device 40 of the second embodiment with the projection type display device 20 of the above first embodiment is that polarization separation elements are arranged at the light source side and projection optical system side of the polarization beam splitter, two dichroic mirrors are arranged at angles of 45 degrees with respect to the optical axis of the incident light so that the angles formed by the optical axes of the incident illumination light and the optical axes of the reflected illumination light become angles θ1 and θ2 smaller than 90 degrees, and, further, three phase difference plates are arranged on the path of the light through predetermined guide mechanisms so as to enable them to rotate within a predetermined angular range about the optical axis of the illumination light.

Below, an explanation will be given of the specific configuration and operation of the projection-type display device 40 according to the second embodiment with reference to the drawings.

In the projection-type display device 40 of FIG. 10, a light source 41 is comprised for example of a discharge lamp 42 and a reflector 43 and projects white illumination light.

Further, the light source 41 uses fly eye lenses 44A and 44B to make the distribution of the amount of the illumination light uniform, then emits it to a plane polarization conversion element 45. Here, the plane polarization conversion element 45 is an optical element which mainly selectively transmits the s-polarization component and converts the p-polarization component orthogonal to this to an s-polarization component.

By this, the light source 41 increases the polarization component effective for the image display in the illumination light emitted with various plane polarizations from the discharge lamp 42, and reduces the polarization component orthogonal to this and emits the resultant illumination light. As a result, the efficiency of utilization of the illumination light is improved by that amount and the contrast of the display image is improved.

A convex lens 46 converges and emits the illumination light on the path of the illumination light emitted from the plane polarization conversion element 45.

A cold mirror 47 reflects and emits the components of the illumination light emitted from the convex lens 46 except for the infrared region in a direction 90 degrees from the path of the input light.

A convex lens 48 converges and emits the illumination light reflected at the cold mirror 47.

Further, in the projection-type display device 40 according to the second embodiment, a polarization separation element 49 is arranged between the convex lens 48 and the input plane of the illumination light of the polarization beam splitter 50.

The polarization separation element 49 is formed by laminating films of predetermined thicknesses having optical anistropy, selectively transmits the s-polarization component, and selectively reflects the p-polarization component orthogonal to this.

Due to this, in the projection-type display device 40, the efficiency of utilization of the illumination light is improved and the p-polarization component leaking from the polarization beam splitter 50 to the reflection-type liquid crystal panels 51B, 51R, and 51G is reduced to improve the contrast.

The polarization beam splitter 50 is for example formed by adhering inclined planes of rectangular prisms to each other and is formed with a detecting plane 50A at the adhered planes. The polarization beam splitter 50 selectively reflects and emits from the detecting plane 50A the illumination light due to the s-polarized light emitted from the convex lens 48 and selectively passing through the polarization separation element 49, while selectively transmits the p-polarization component in the synthesized optical image incident traveling back along the path of the illumination light due to the s-polarized light and returns the s-polarization component to the light source 41.

The dichroic mirror 51B is formed by laminating a transparent dielectric film on sheet glass and functions as a wavelength separation mirror for selectively reflecting a predetermined wavelength component in the incident light and selectively transmitting the remaining components. The dichroic mirror 51B selectively reflects the illumination light of the blue band in the illumination light emitted from the polarization beam splitter 50 and emits it toward the reflection-type liquid crystal panel 52B while transmits the remaining components.

The reflection-type liquid crystal panel 52B is driven by a blue color signal and is formed with the blue image in the image to be displayed by the projection-type display device 40. The reflection-type liquid crystal panel 52B transmits the illumination light reflected from the dichroic mirror 51B and incident through a phase difference plate 53B. This light is reflected by a reflecting plate arranged at its back and is again emitted passing through it. Due to this, it emits modulated light rotated in plane polarization in accordance with the blue image. Due to this, the reflection-type liquid crystal panel 52B emits the optical image based on the synthesized light of the p-polarized light and s-polarized light for the illumination light incident due to the s-polarized light toward the dichroic mirror 51B.

The dichroic mirror 51B selectively reflects the modulated light incident from the reflection-type liquid crystal panel 52B in this way and emits it to the polarization beam splitter 50 and, further, transmits the modulated light incident from the following dichroic mirror 51R to the polarization beam splitter 50.

Further, the dichroic mirror 51B is arranged at an inclination of an angle of 45 degrees with respect to the optical axis of the incident light so that the angle θ1 formed by the optical axis of the incident light and the optical axis of the optical image obtained from the reflection-type liquid crystal panel 52B becomes smaller than 90 degrees.

The dichroic mirror 51B is arranged in this way for the following reason.

That is, in the dichroic mirror 51B for selectively reflecting only the incident light of the desired wavelength, the cutoff wavelength for selective transmission and reflection differs between the p-polarization component and the s-polarization component incident from an inclination. As opposed to this, in this type of projection-type display device 40, the incident light of the s-polarization component is reflected at the reflection-type liquid crystal panel 52B, while the optical image of the p-polarization component incident from the reflection-type liquid crystal panel 52B is reflected and emitted to the polarization beam splitter 50. Due to this, if the cutoff wavelength for the selective transmission of the p-polarization component and the s-polarization component differs in this way, the efficiency of utilization of the light is reduced by that amount.

However, there is the characteristic feature that if the incident angle of the incident light becomes smaller, the difference in the cutoff wavelength in the reflected light of the p-polarization component and the s-polarization component is reduced by that amount.

Therefore, in the projection-type display device 40, the dichroic mirror 51B is arranged at an inclination of an angle of 45 degrees with respect to the optical axis of the incident light so that the angle θ1 formed by the optical axis of the incident light and the optical axis of the optical image obtained from the reflection-type liquid crystal panel 52B becomes smaller than 90 degrees.

The reflection-type liquid crystal panel 52B is arranged close to the polarization beam splitter 50 side so as to enable the shape of the projection-type display device 30 as a whole to be made smaller.

The dichroic mirror 51R is formed by laminating a transparent dielectric film on sheet glass and functions as a wavelength separating mirror for selectively reflecting a predetermined wavelength component in the incident light and selectively transmitting the remaining components. The dichroic mirror 51R selectively reflects the illumination light of the red band in the illumination light passing through the dichroic mirror 51B and emits it toward the reflection-type liquid crystal panel 52R, while transmits the remaining components and emits them toward the reflection-type liquid crystal panel 52G.

The reflection-type liquid crystal panel 52R is driven by a red color signal and is formed with the red image in the image to be displayed by the projection-type display device 40. The reflection-type liquid crystal panel 52R transmits the illumination light reflected from the dichroic mirror 51R and incident through a phase difference plate 53R. This light Is reflected by a reflecting plate arranged at its back and is again emitted passing through it. Due to this, it emits modulated light rotated in plane polarization in accordance with the red image. Due to this, the reflection-type liquid crystal panel 52R emits the optical image based on the synthesized light of the p-polarized light and s-polarized light for the illumination light incident due to the s-polarized light toward the dichloro mirror 51R.

The reflection-type liquid crystal panel 52G is driven by a green color signal and is formed with the green image in the image to be displayed by the projection-type display device 40. The reflection-type liquid crystal panel 52G transmits the illumination light transmitted from the dichroic mirror 51R and incident through a phase difference plate 53G. This light is reflected by a reflecting plate arranged at its back and is again emitted passing through it. Due to this, it emits modulated light rotated in plane polarization in accordance with the green image. Due to this, the reflection-type liquid crystal panel 52G emits the optical image due to the synthesized light of the p-polarized light and s-polarized light for the illumination light incident due to the s-polarized light toward the dichroic mirror 51R.

The dichroic mirror 51R selectively reflects the modulated light incident from the reflection-type liquid crystal panel 52R in this way and emits it to the dichroic mirror 51B and, further, transmits the modulated light incident from the following reflection-type liquid crystal panel 52G to the dichroic mirror 51B.

In the dichroic mirror 51R for synthesizing and emitting the green and red modulated light in this way as well, if the wavelength becomes different in the reflected light of the p-polarization component and s-polarization component, and the angle of incidence of the incident light becomes small, the difference of the wavelength becomes smaller by that amount. Therefore, the dichroic mirror 51R is arranged in parallel with the dichroic mirror 51B and is arranged at an inclination of an angle of 45 degrees with respect to the optical axis of the incident light so that the angle θ2 formed by the optical axis of the incident light and the optical axis of the optical image obtained from the reflection-type liquid crystal panel 52R becomes smaller than 90 degrees.

Further, the reflection-type liquid crystal panel 52R is arranged close to the polarization beam splitter 50 side so as to enable the shape of the projection-type display device 40 as a whole to be made smaller.

Further, the polarization beam splitter 50 supplies the illumination light based mainly on the s-polarized light emitted from the light source 41 to the dichroic mirrors 51B, 51R, etc. and passes the p-polarization component in the optical image resulting from the synthesized image of the p-polarized light and the s-polarized light produced by the reflection-type liquid crystal panels 52B, 52R, and 52G and emits it to the screen.

The above-mentioned phase difference plates 53B, 53R, and 53G are arranged facing the light incidence/emission planes of the reflection-type liquid crystal panels 52B, 52R, and 52G and give phase differences to the incident illumination light and the emitted optical images of the reflection-type liquid crystal panels 52B, 52R, and 52G. Due to this, the unmodulated optical image component leaking from the polarization beam splitter 50 to the projection lens 55 side is reduced.

Further, the phase difference plates 53B, 53R, and 53G are arranged on the paths of the light through predetermined guide mechanisms so as to be able to rotate within a predetermined angular range about the optical axis of the illumination light.

Note that the guide mechanisms here are comprised by for example arc-shaped grooves etc. holding the outer peripheries of the phase difference plates 53B, 53R, and 53G.

The phase difference plates 53B, 53R, and 53G are made to rotate in planes substantially orthogonal to the optical axes within the predetermined range by trimming with a tool using the guide mechanisms and then secured at the position where the haze phenomenon is improved most by for example an adhesive so as not to later rotate.

The phase difference plates 53B, 53R, and 53G are arranged secured close to the corresponding reflection-type liquid crystal panels 52B, 52R, and 52G so as to cut orthogonally across the optical axes of the illumination light and the optical images. The phase difference plates 53B, 53R, and 53G are set with thicknesses D so as to enable retardations of 165 nm, 190 nm, and 180 nm to be given between the ordinary rays and extraordinary rays for the transmission light orthogonal to the incidence plane. Note that the phase difference plates 53B, 53R, and 53G are uniaxial crystals of indexes of refraction No of 1.4 and Ne of 1.40234. The retardation is shown by ΔND.

The phase difference plates 53B, 53R, and 53G set retardations for the incident light between the ordinary rays and extraordinary rays so as to cancel out the overall retardation comprised of the retardation corresponding to one-quarter of the wavelength of the incident light due to the polarization beam splitter 50 plus the retardations due to the corresponding dichroic films.

Further, in the projection-type display device 40 according to the second embodiment, a polarization separation element 54 is arranged between the emission plane of the optical image of the polarization beam splitter 50 and the projection lens 55.

The polarization separation element 54 is formed by laminating a film of a predetermined thickness having optical anistropy, selectively transmits the p-polarization component, and selectively reflects the s-polarization component orthogonal to this. Due to this, in the projection-type display device 40, the s-polarization component leaking from the polarization beam splitter 50 is reduced to improve the contrast.

The projection lens 55 of the projection optical system enlarges and projects the transmission light of the polarization separation element 54 on the screen 56.

Next, an explanation will be made of the operation of the projection-type display device of FIG. 10.

The components of the illumination light emitted from the light source 41 except for the infrared rays are bent 90 degrees in path at the cold mirror 47 and are incident to the polarization separation element 49. At the polarization separation element 49, the s-polarization component in the illumination light is selectively extracted and emitted to the polarization beam splitter 50.

In the polarization beam splitter 50, the illumination light of the s-polarization component is selectively reflected and emitted toward the first dichroic mirror 51B. The blue illumination light is selectively reflected at the first dichroic mirror 51B and emitted toward the blue reflection-type liquid crystal panel 52B. The remaining green and red illumination light pass through the first dichroic mirror 51B and strike the second dichroic mirror 51R.

The illumination light striking the second dichroic mirror 51R is broken down into the red illumination light and the green illumination light. The red illumination light and the green illumination light are emitted toward the red reflection-type liquid crystal panel 52R and the green reflection-type liquid crystal panel 52G by reflection and transmission by the second dichroic mirror 51R. Due to this, the illumination light of the corresponding wavelengths are supplied to the blue, red, and green reflection-type liquid crystal panels 52B, 52R, and 52G through the phase difference plates 53B, 53R, and 53G and are rotated in plane polarization by the corresponding color signals at the reflection-type liquid crystal panels 52B, 52R, and 52G, whereby blue, red, and green optical images due to the p-polarized light and the s-polarized light are generated.

The blue, red, and green illumination light due to the p-polarized light and the s-polarized light in this way travel back along the paths of the illumination light incident to the reflection-type liquid crystal panels 52B, 52R, and 52G and are synthesized by the first and second dichroic mirrors 51B and 51R. The p-polarization component in the synthesized optical image obtained as a result passes through the polarization beam splitter 50 and is incident to the polarization separation element 54. At the polarization separation element 54, the p-polarization component is selectively transmitted, while the s-polarization component orthogonal to this is selectively reflected.

Further, the optical image transmitted through the polarization separation element 54 is projected from the projection lens 55 to the screen 56. Due to this, the blue, red, and green images produced at the reflection-type liquid crystal panels 52B, 52R, and 52G are enlarged and projected on the screen 56 to form the color display image.

In general, in the optical image projected on the screen 56, the unmodulated component which originally should not be polarized, but simply reflected at the reflection-type liquid crystal panels 52B, 52R, and 52G is mixed in. Due to this, the reduction of the contrast due to the haze phenomenon is observed at the display image projected on the screen 56.

This is due, in the final analysis, to the incidence of the optical image striking the polarization beam splitter 50 due to elliptical polarization. This elliptical polarization occurs due to detection of the illumination light and production of an s-polarization component by an inclined detecting plane 50A at the polarization beam splitter 50 whereby a phase difference corresponding to substantially one-quarter of the wavelength of the colors is given between the planes of vibration as seen from the reflection-type liquid crystal panels 52B, 52R, and 52G and, further, this s-polarization component is given a similar phase difference due to the phase characteristics at the dichroic mirrors 51B, 51R.

The above-mentioned phase difference changes depending on the wavelength and angle of incidence of the transmission light. Due to this, with just arranging quarter wavelength plates in front of the reflection-type liquid crystal panels, it would become difficult to sufficiently prevent the haze phenomenon.

In the second embodiment, however, by arranging phase difference plates 53B, 53R, and 53G at the incidence planes of the reflection-type liquid crystal panels 52B, 52R, and 52G and setting retardations between the ordinary rays and extraordinary rays at the phase difference plates 53B, 53R, and 53G, the retardation comprised of the retardation corresponding to one-quarter of the wavelength of the incident light due to the polarization beam splitter 50 plus the retardations due to the dichroic mirrors 51B, 51R of the color separating and synthesizing means is canceled out.

Due to this, the unmodulated optical image leaking from the polarization beam splitter 50 at the black level portion to the projection lens 55 becomes extremely small and the reduction in the contrast due to this haze phenomenon is reduced by that extent.

That is, in the second embodiment, the retardations at the phase difference plates 53B, 53R, and 53G are changed in various ways, the amounts of light passing through the polarization beam splitter 50 in the case of the black level are calculated by the ray tracing for every wavelength and angle of incidence for the illumination light incident from the polarization beam splitter 50, and retardations giving the smallest overall amount of light are set at the phase difference plates 53B, 53R, and 53G based on the overall amount of light resulting from addition of the light calculated in this way.

Further, at this time, the amounts of light are corrected based on the characteristics of human vision to calculate the overall amount of light. Due to this, the retardations of the phase difference plates 53B, 53R, and 53G are set so that the haze phenomenon is hardest to sense.

That is, from a comparison with FIG. 4 and FIGS. 5A to 5J, as shown in FIG. 11 and FIGS. 12A to 12F showing the changes in the states of polarization of the green color, the optical image is given a phase difference by the phase difference plate 53G so that the orientation of the long axis of the elliptical polarization matches the orientation of the p-component at the detecting plane 50A of the polarization beam splitter 50. Due to this, it is possible to make the amount of the illumination light leaking from the polarization beam splitter 50 to the projection lens 55 at the black level portion extremely small and possible to prevent a reduction in the contrast due to the haze phenomenon by that amount.

Figure 13:
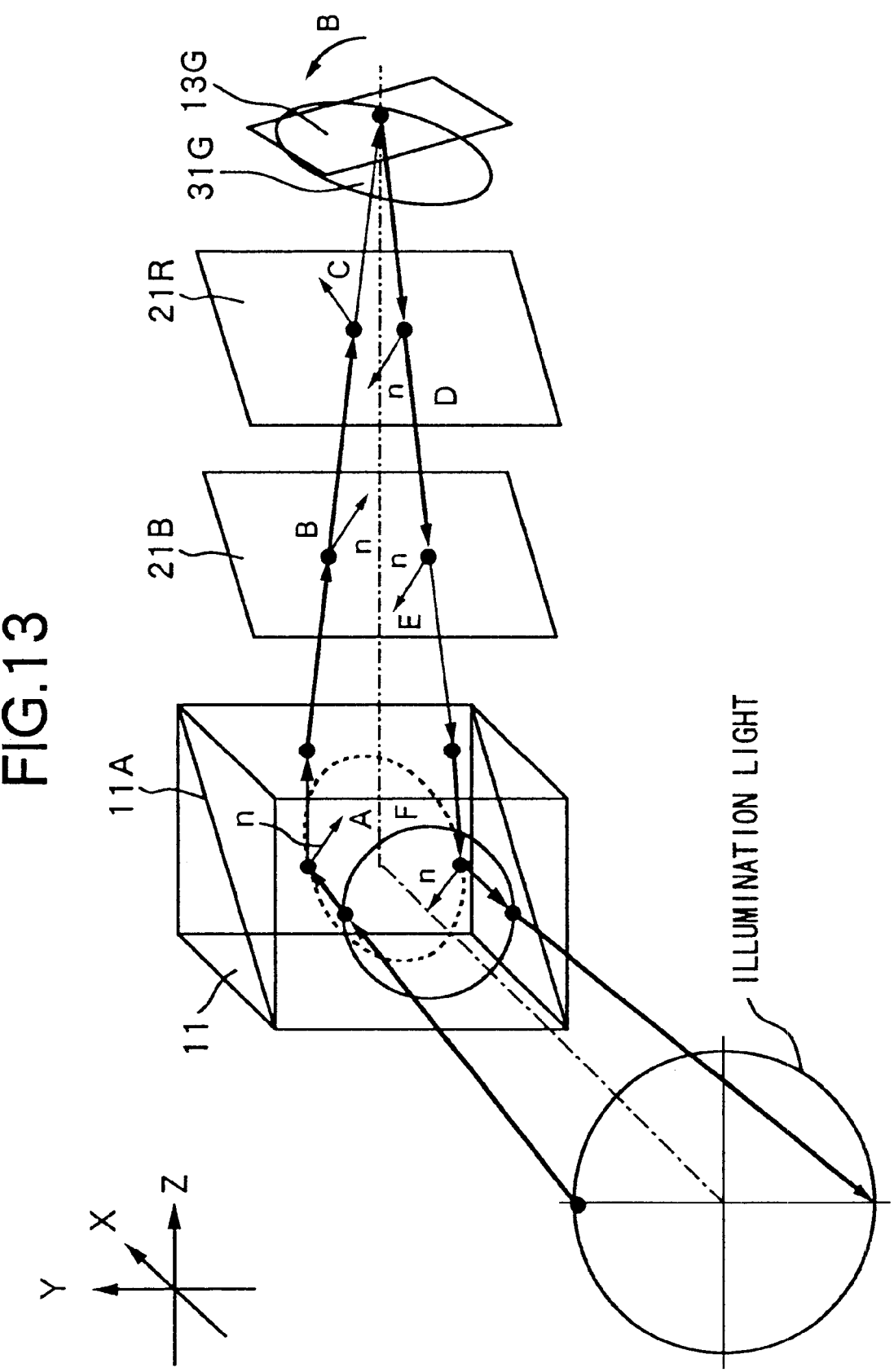
FIG. 13 is a view of the path of the illumination light and the optical images in the case of inclined arrangement of the reflection-type liquid crystal panels in the projection-type display device of FIG. 10, FIGS. 14A to 14F are views of the states of polarization on the path of light of FIG. 13.

Even if doing this, however, as shown by the arrow B in FIG. 13, it is no longer possible to sufficiently reduce the haze phenomenon when the reflection-type liquid crystal panel 52G etc. are arranged at an inclination.

Figure 14A:
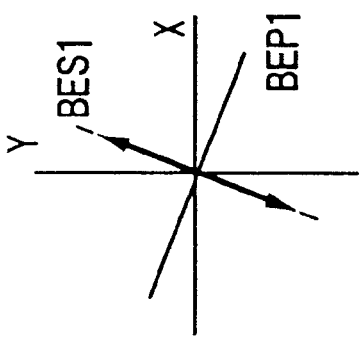
Figure 14B:
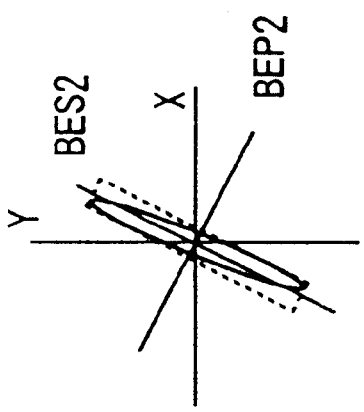
Figure 14C:
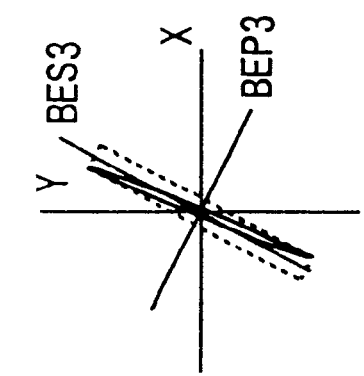
Figure 14D:
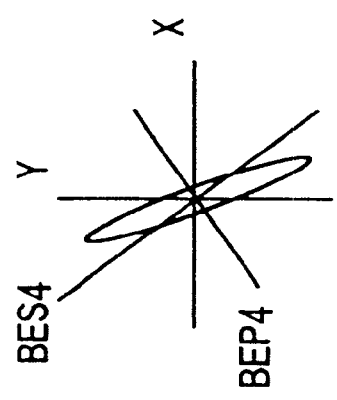
Figure 14E:
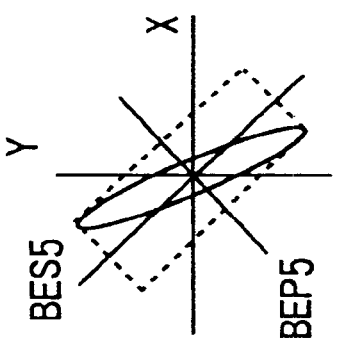
Figure 14F:
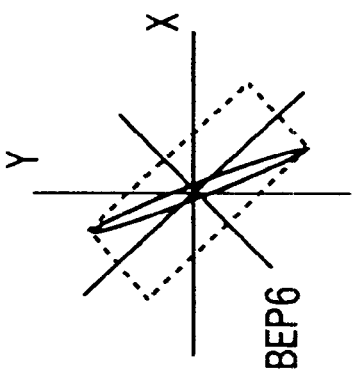
Figure 15:
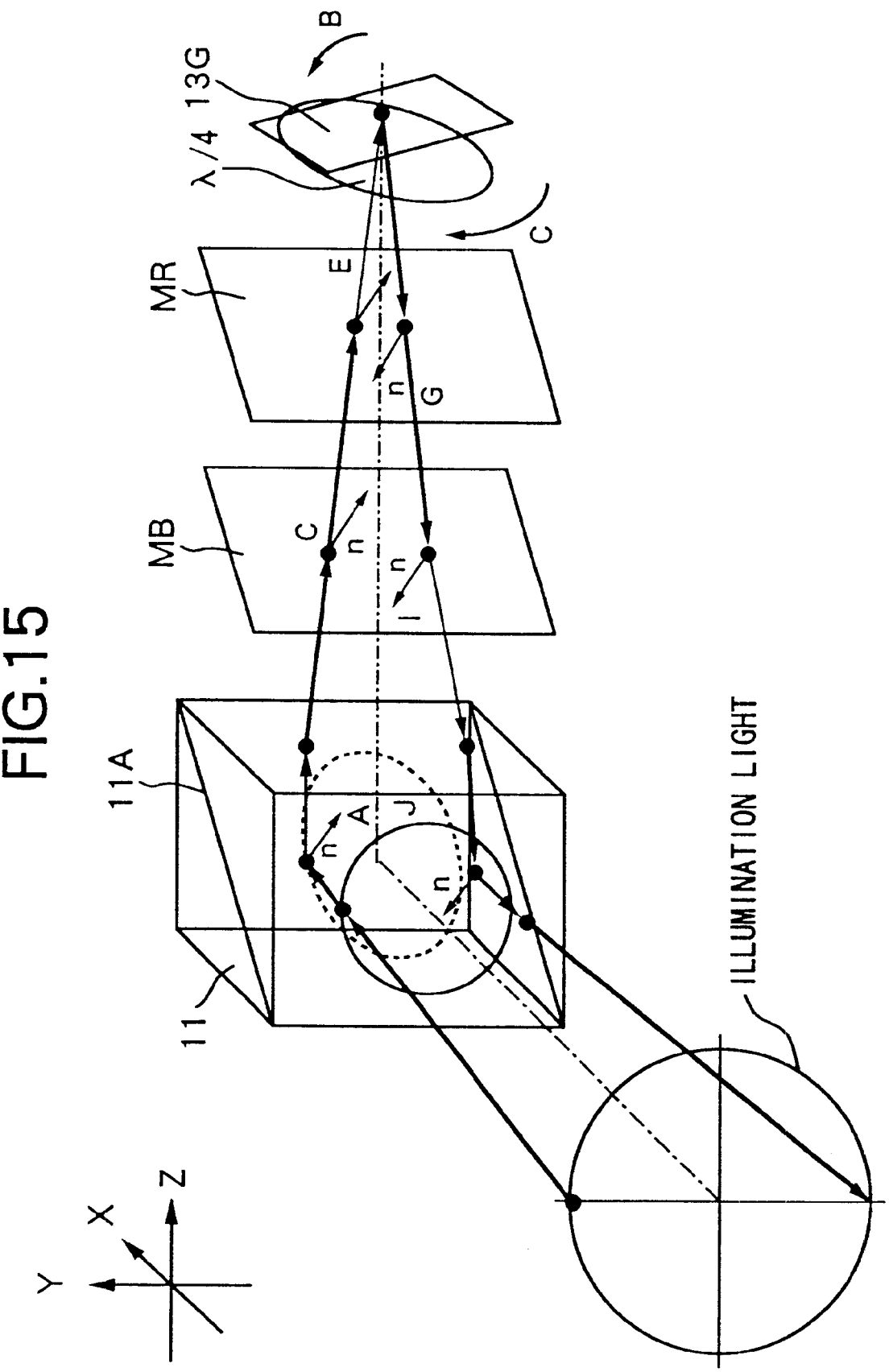
FIG. 15 is a view of the state of correction by phase difference plates on the path of light of FIG. 13, FIGS. 16A to 16F are views of the states of polarization on the path of light of FIG. 15.
Figure 16A:
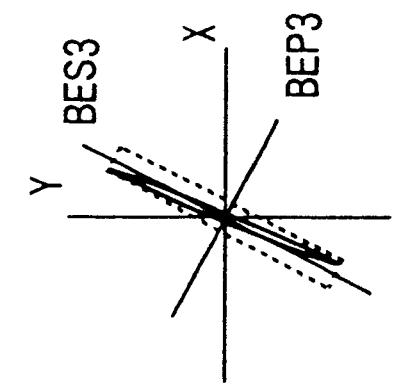
Figure 16B:
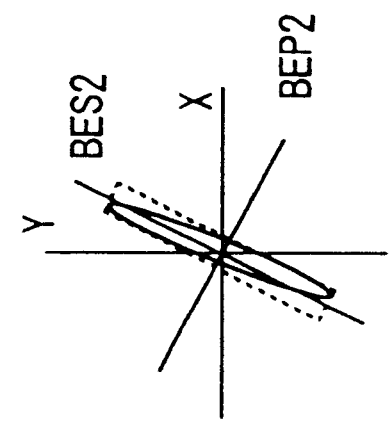
Figure 16C:
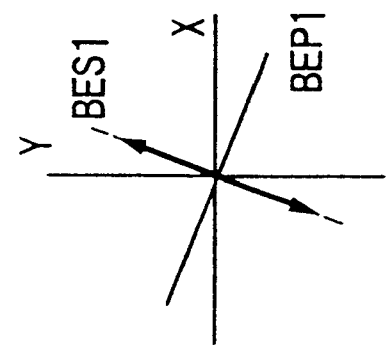
Figure 16D:
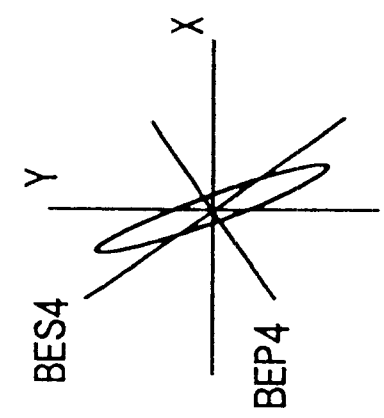
Figure 16E:
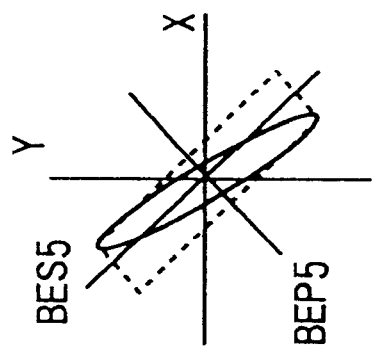
Figure 16F:
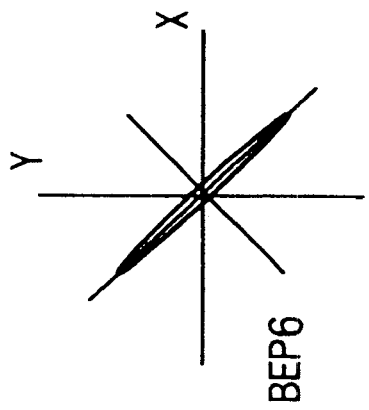

That is, from a comparison with FIGS. 12A to 12F, as shown in FIGS. 14A to 14F, the boundary plane with respect to the optical image changes and therefore the component leaking to the projection lens 55 increases at the polarization beam splitter 50 in the case where the reflection-type liquid crystal panel 52G is inclined as shown in FIGS. 14D to 14F.

In the second embodiment, however, the corresponding phase difference plates 53B, 53R, and 53G are rotated by the amounts of the inclination of the reflection-type liquid crystal panel 52G etc. to change the directions of polarization of the optical images at the changed incidence planes and make the direction of polarization of the optical images and the direction of polarization of the detecting plane match at the polarization beam splitter 50 in the end, whereby it is possible to prevent the haze phenomenon made worse due to the inclination.

That is, from a comparison with FIG. 13 and FIGS. 14A to 14F, as shown in FIG. 15 and FIGS. 16A to 16F, for example the reflection-type liquid crystal panel 52G is made inclined by θ degrees in the counterclockwise direction at the YZ plane. In this case, it is possible to incline the phase difference plate 53G by θ/2 degrees in the counterclockwise direction in the XY plane and thereby suppress the occurrence of the transmission light component (p-polarization component) of the polarization beam splitter 50.

Due to this, even if the assembly precision of the optical system as a whole is reduced, it is possible to sufficiently prevent a reduction in the contrast due to the haze phenomenon.

FIG. 17 is a graph showing the actual contrast. In FIG. 17, the contrast falls by an extreme degree if the reflection-type liquid crystal panel 52G is inclined by a slight angle (shown by the reference F) compared with the ideal state of polarization shown by the reference E. If the phase difference plate 53G is rotated (shown by reference G), however, it is learned that the contrast can be improved to a state close to the substantially ideal state.

As explained above, according to the second embodiment, it is of course possible to use the phase difference plates 53B, 53R, and 53G to cancel out the retardation comprised of the retardation corresponding to one-quarter of the wavelength of the incident light due to the polarization beam splitter 50 plus the retardations due to the dichroic mirrors 51B, 51R of the color separating and synthesizing means so as to reduce the haze phenomenon and also possible to rotate the phase difference plates 53B, 53R, and 53G to adjust the phase differences given to the illumination light and the optical images so as to reliably reduce the haze phenomenon by the rotation of the phase difference plates 53B, 53R, and 53G even when the reflection-type liquid crystal panels 52B, 52R, and 52G etc. are inclined. Therefore, it is possible to simplify the assembly precision and simply and reliably prevent deterioration in the contrast due to the haze phenomenon by that amount.

Further, by this type of adjustment, it is possible to correct the deterioration in the state of polarization even for a change in the incidence plane at the illumination light side so as to reduce the assembly precision and reduce the haze phenomenon for the light source side as well. Due to this, it is possible to simplify the configuration of the optical system of the projection-type display device 40 as a whole. Further, it is possible to shorten the time required for assembly and simplify the tools required for the assembly by that amount.

Further, by securing the parts so as not to allow rotation after adjustment in this way, it is possible to prevent an increase in the black level due to aging etc. even when making adjustment by making the phase difference plates 53B, 53R, and 53G rotatable in this way.

Further, according to the second embodiment, since the dichroic mirrors are arranged at inclinations so that the angles formed between the optical axes of the illumination light on the dichroic mirrors constituting the wavelength separation mirror and the optical axes of the modulated light become angles smaller than 90 degrees, when modulated light due to the p-polarized light and s-polarized light is generated from the illumination light due to the s-polarized light and projected on the screen, it is possible to reduce the difference in wavelength at the p-polarization component and the s-polarization component of the reflected light, improve the efficiency of utilization of the illumination light by that amount, and, as a result, display a high quality image.

Further, by arranging polarization separation elements between the light source and the polarization beam splitter and between the polarization beam splitter and the projection optical system so as to have the p-polarization component and the s-polarization component absorbed there, it is possible to prevent the haze phenomenon of the display image and increase the contrast and possible to display that much higher a quality of an image.

Third Embodiment

Figure 18:
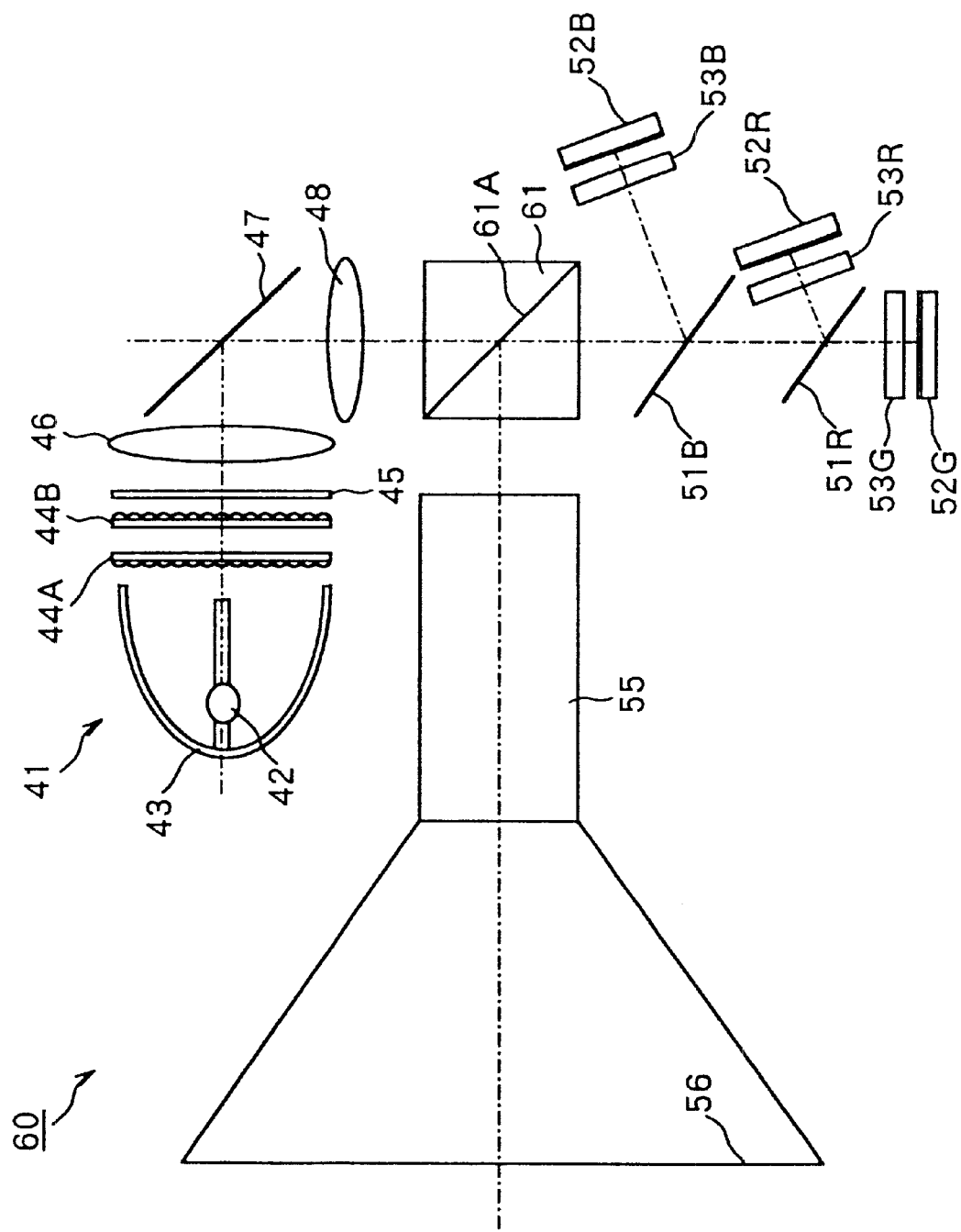
FIG. 18 is a view of the configuration of a third embodiment of a projection-type display device according to the present invention.

FIG. 18 is a view of the configuration of a third embodiment of a projection-type display device according to the present invention.

In the projection-type display device 60 according to the third embodiment, a polarization beam splitter 60 with different planes of polarization for transmission and reflection from the polarization beam splitter 50 of the projection-type display device 40 of the second embodiment is arranged and the arrangement of the optical system is changed correspondingly.

Further, in the third embodiment, no polarization separation element is provided. Note that in the third embodiment, it is of course possible to arrange a polarization separation element in the same way as the second embodiment.

In this projection-type display device 60, parts the same as the above projection-type display device 40 are shown with corresponding references and overlapping explanations will be omitted.

That is, in the projection-type display device 60, the polarization beam splitter 61 transmits the s-polarized light and reflects the p-polarized light. The dichroic mirror 51R etc. are arranged on the path of the illumination light transmitted through the polarization beam splitter 61 corresponding to this.

As shown in FIG. 18, it is possible to obtain a similar effect to the above second embodiment even when using a polarization beam splitter of a different configuration.

Note that in the above first to third embodiments, the explanation was made of the case of arranging of phase difference plates at the reflection-type liquid crystal panels, but the present invention is limited to this. Arrangement of the phase difference plate at any reflection-type liquid crystal panel may be omitted within a sufficient range in practice.

Further, in the above first to third embodiments, the explanation was made of the case of using dichroic mirrors as color separating and synthesizing means for breaking down the illumination light or synthesizing the optical images, but the present invention is not limited to this. It is also possible to broadly apply the invention to the case of use of dichroic prisms.

Further, in the above first to third embodiments, the explanation was made of the case of arranging just a color separating and synthesizing means between the reflection-type liquid crystal panels from the polarization beam splitter, but the invention is not limited to this. For example, it is possible to broadly apply the prevent invention to the case of arranging a lens for astigmatism correction.

Further, in the above first to third embodiments, the explanation was made of the case of giving retardations of 165 nm, 190 nm, and 180 nm between the ordinary rays and extraordinary rays by the phase difference plates 32B, 32R, and 32G and 53B, 53R, and 53G, but the invention is not limited to this. By changing the phase differences given from the polarization beam splitter to the reflection-type liquid crystal panels in various ways by the characteristics of the optical system, it is possible to suitably set the retardations to optimal values in accordance with the characteristics of the optical system to obtain a similar effect to the above embodiment. Incidentally, while differing depending on the optical system and further the spectral distribution of the illumination light, in this type of projection-type display device, it is possible to obtain a similar effect to the above embodiments by suitably selecting the retardations in the range of 55 nm to 235 nm, 75 nm to 310 nm, and 65 nm to 275 nm by the corresponding phase difference plates in the blue, red, and green wavelength bands.

While the invention has been described with reference to specific embodiments chosen for the purpose of illustration, it should be apparent that numerous modifications could be made thereto by those skilled in the art without departing from the basic concept and scope of the invention.

What is claimed is:

1. A projection-type display device, comprising at least:

a plurality of reflection-type image forming means for spatially modulating and reflecting incident light and projecting optical images rotated in plane polarization with respect to a plane polarization of the incident light;

a light source for emitting illumination light;

color separating and synthesizing means for breaking down the illumination light by wavelengths corresponding to the reflection-type imaging forming means and outputting the results to the reflection-type image forming means and for synthesizing optical images obtained from the reflection-type image forming means and emitting the synthesized optical image;

a projection optical system for projecting the synthesized optical image to a predetermined projection object; and a polarization beam splitter for emitting a predetermined plane polarization component from the illumination light emitted from the light source to the color separating and synthesizing means and emitting the synthesized optical image obtained from the color separating and synthesizing means to the projection optical system;

phase difference plates being arranged facing the light incidence/emission planes of the reflection-type image forming means;

the retardations at the phase difference plates having retardation values set based on results of ray tracing from the polarization beam splitter to the reflection-type image forming means, changing in accordance with the characteristics of the color separating and synthesizing means with respect to the angle of incidence and wavelength, and wherein the amount of light is corrected in accordance with characteristics of human vision.

2. A projection-type display device as set forth in claim 1, wherein the color separating and synthesizing means comprises at least one dichroic mirror.

3. A projection-type display device as set forth in claim 1, wherein the color separating and synthesizing means comprises at least one dichroic prism.

4. A projection-type display device as set forth in claims 1, further comprising a polarization filter for selectively transmitting illumination light of a plane polarization corresponding to the plane polarization of the light incident on the reflection-type image-forming means, the polarization filter disposed between the light source and the color separating and synthesizing means.

5. A projection-type display device as set forth in claim 1, further comprising a polarization filter disposed between the light source and the color separating and synthesizing means, the polarization filter selectively transmitting illumination light of a plane polarization corresponding to the plane polarization of said light incident on the reflection-type image-forming means and selectively reflecting illumination light of a plane polarization perpendicular to the plane polarization of the light incident on said reflection-type image-forming means.

6. A projection-type display device as set forth in claim 1, further comprising a polarization filter for selectively transmitting illumination light of a plane polarization perpendicular to the plan polarization of the light incident on the reflection-type image-forming means is arranged between the polarization beam splitter and the projection optical system.

7. A projection-type display device as set forth in claim 1, further comprising a polarization filter disposed between the polarization beam splitter and the projection optical system, the polarization filter selectively transmitting illumination light of a plane polarization perpendicular to the plane polarization of said light incident on the reflection-type image-forming means arranged and selectively reflecting illumination light of a plane polarization corresponding to the plane polarization of said light incident on said reflection-type image-forming means.

8. A projection-type display device as set forth in claim 1, wherein the retardations of the phase difference plates are set in accordance with a smallest overall amount of light passing through the polarization beam splitter in the case of a black level.

9. A projection-type display device as set forth in claim 8, wherein the color separating and synthesizing means comprises at least one dichroic mirror.

10. A projection-type display device as set forth in claim 8, wherein the color separating and synthesizing means comprises at least one dichroic prism.

* * * * *